(12) United States Patent
Yokota et al.

(10) Patent No.: US 8,184,805 B2
(45) Date of Patent: May 22, 2012

(54) PROGRAM CONVERTER, ENCRYPTING DEVICE, AND ENCRYPTING METHOD

(75) Inventors: Kaoru Yokota, Hyogo (JP); Motoji Ohmori, Osaka (JP); Yuichi Futa, Osaka (JP)

(73) Assignee: Panasonic Corporation, Osaka (JP)

( * ) Notice: Subject to any disclaimer, the term of this patent is extended or adjusted under 35 U.S.C. 154(b) by 176 days.

(21) Appl. No.: 12/756,440

(22) Filed: Apr. 8, 2010

(65) Prior Publication Data

US 2010/0195822 A1 Aug. 5, 2010

Related U.S. Application Data

(62) Division of application No. 11/912,489, filed as application No. PCT/JP2006/308582 on Apr. 24, 2006, now Pat. No. 7,724,897.

(30) Foreign Application Priority Data

Apr. 28, 2005 (JP) ................... 2005-131960

(51) Int. Cl.
*G06F 21/00* (2006.01)
(52) U.S. Cl. .............................. 380/28; 726/26; 713/187
(58) Field of Classification Search .................. None
See application file for complete search history.

(56) References Cited

U.S. PATENT DOCUMENTS

| | | | |
|---|---|---|---|
| 6,278,783 | B1 | 8/2001 | Kocher et al. |
| 6,658,569 | B1 | 12/2003 | Patarin et al. |
| 6,873,706 | B1 | 3/2005 | Miyazaki et al. |
| 2003/0048903 | A1 | 3/2003 | Ito et al. |
| 2003/0142820 | A1 | 7/2003 | Futa et al. |
| 2005/0232430 | A1 | 10/2005 | Gebotys |

FOREIGN PATENT DOCUMENTS

| | | |
|---|---|---|
| EP | 1 267 514 | 12/2002 |
| JP | 2002-519722 | 7/2002 |
| JP | 2002-536911 | 10/2002 |
| JP | 2002-366029 | 12/2002 |
| JP | 2003-288013 | 10/2003 |
| JP | 2003-288014 | 10/2003 |
| JP | 2005-086670 | 3/2005 |
| WO | 99/35782 | 7/1999 |
| WO | 99/67919 | 12/1999 |
| WO | 01/24439 | 4/2001 |

OTHER PUBLICATIONS

International Search Report issued May 23, 2006 in International Application No. PCT/JP2006/308582.
Stanley Chow et al., "*White-Box Cryptography and an AES Implementation*", Selected Areas in Cryptography (LNCS2595), Springer-Verlag, 2003.

*Primary Examiner* — Oscar Louie
(74) *Attorney, Agent, or Firm* — Wenderoth, Lind & Ponack, L.L.P.

(57) ABSTRACT

A program converter (1) converts a program (P) which performs arithmetic addition processing to execute encryption, into a converted program (tP) which performs processing equivalent to the processing of the program (P). The program converter (1) includes: a key data extraction unit (10) which extracts key data from the program (P); an addition table generation unit (11) which generates an addition table from the extracted key data; a conversion table extraction unit (12) which extracts a conversion table from the program (P); a table merger unit (13) which generates a merger table by merging the generated addition table and the extracted conversion table; a random number generation unit (14) which generates a random number; a table randomization unit (15) which generates a randomized merger table by randomizing the merger table using the generated random number; and a converted-program generation unit (16) which generates the converted program (tP) according to the generated randomized merger table.

10 Claims, 16 Drawing Sheets

PROGRAM CONVERTER, ENCRYPTING DEVICE, AND ENCRYPTING METHOD

This application is a divisional of application Ser. No. 11/912,489 filed Oct. 24, 2007 now U.S. Pat. No. 7,724,897, which is the National Stage of International Application No. PCT/JP2006/308582, filed Apr. 24, 2006.

TECHNICAL FIELD

The present invention relates to program converters, and more particularly to a program converter which converts programs executing encryption.

BACKGROUND ART

In recent years, for attacks to cryptographic modules implemented in software or hardware, various malicious deciphering methods have been conceived to decipher data of the encryption key without authorization, through an analysis of intermediate data generated during execution of the encryption employing some sort of techniques. For example, in order to attack cryptographic modules implemented in software, using a development tool such as a debugger, an attacker can extract the intermediate data of the encryption execution directly from a register where the data is temporarily stored. Therefore, based on the extracted intermediate data, the encryption key data can be analyzed. Further malicious deciphering methods, such as Simple Power Analysis and Differential Power Analysis, have been proposed to analyze encryption key data by measuring electric power consumption during the execution of the encryption and estimating generated intermediate data. These deciphering methods can be used to attack cryptographic modules implemented in both software and hardware.

As security solution against the above-described deciphering methods, non-patent reference 1 discloses a White-Box cryptography technology. FIG. 1 is a flowchart for explaining an example of the White-Box cryptography technology. Firstly, in this technology, encryption using fixed key data is described by a table. The expression of "encryption is described by a table" means that a relationship between input and output data in each conversion processing during the execution of the encryption is represented in a format of a conversion table. More specifically, the generated table is indicated by indexes representing inputs and elements representing outputs. In this description, it is assumed that an input is represented by an index and an output is represented by an element, in generating the table. For example, in encryption execution, an exclusive OR operation is executed on 8-bit input data X and 8-bit key data K, and the resulting 8-bit data is outputted as output data Y (S2). Here, when the key data has a fixed value, this is considered as fixed conversion of 8-bit input to 8-bit output. Based on the above, all conversion during the encryption are described in a conversion table (S4). Then, the resulting table is randomized by random numbers generated at random. More specifically, as one example, table conversion expressed by Y=Tab[X] (where X is input, Y is output, and Tab[ ] is an array indicated by the conversion table) is randomized using random numbers r1 and r2, to be conversion expressed by rY=Tab[X(+)r1](+)r2 (where (+) denotes an exclusive OR operation for each bit) (S6). The resulting random conversion is further described in a randomized table rTab[ ] (S8). The above randomizing is executed on all table conversion to generate the randomized table. Table conversion using the randomized table is herein called random encryption. The randomized encryption is implemented as a cryptographic module.

In the manner described as above, the input and output data in each table conversion are randomized by random numbers into values distinct from the actual intermediate values in encrypting the key data. Therefore, even if values in a register during the execution of the encryption are monitored, an attacker obtains only the above-described randomized intermediate values and fails to analyze the encryption key data. The non-patent document 1 discloses in detail a method of applying the above-described White-Box cryptography technology to Advanced Encryption Standard (AES) which is adopted as a next-generation cryptographic standard by the US government. In the white-box cryptography technology, mechanism of describing encryption by tables is important. In particular, it is crucial to generate conversion tables whose data amount is as small as possible. [Non-Patent Reference 1] "White-Box Cryptography and an AES Implementation"; Stanley Chow, Philip Eisen, Harold Johnson, Paul C. van Oorschot; Selected Areas in Cryptography (LNCS2595), 2003, Springer-Verlag

DISCLOSURE OF INVENTION

Problems that Invention is to Solve

However, the above-described conventional technologies have a problem of difficulty in being applied to encryption using operations, such as arithmetic addition, since such operations are difficult to be described by conversion tables whose data amount is small. The problem is explained in the following example. It is assumed that processing Y=X+K executes an arithmetic addition of 32-bit key data K with 32-bit input data X, and obtains the resulting value Y as output data. When the processing Y=X+K is described by a table, the table conversion becomes Y=Tab[X] of 32-bit data to 32-bit data, since a carry of each digit has to be provided to a higher digit. However, the data amount of the conversion table Tab[ ] eventually becomes 32 bits×2^(32)=16 gigabytes (where $\alpha^\beta$ denotes $\alpha$ to $\beta$th power), so that such a table is not practically implementable.

On the other hand, the problem is explained in another example where an exclusive OR operation Y=X(+)K, not the arithmetic addition, is described by a table. FIG. 2 is a flowchart for explaining how to describe an exclusive OR operation by a table.

An exclusive OR operation Y=X(+)K (S12) is separated into following four operations, by separating 32-bit input data X and 32-bit key data K into 8-bit data x0, x1, x2, x3, and k0, k1, k2, k3 (S14).

$$y0 = x0(+)k0$$

$$y1 = x1(+)k1$$

$$y2 = x2(+)k2$$

$$y3 = x3(+)k3$$

Each of the resulting exclusive OR operations are represented by the following operations, using conversion tables Tab0[ ], Tab1[ ], Tab2[ ], and Tab3[ ] (S16).

$$y0 = Tab0[x0]$$

$$y1 = Tab1[x1]$$

$$y2 = Tab2[x2]$$

$$y3 = Tab3[x3]$$

Then, y0, y1, y2, and y3 are concatenated to obtain output data Y (S18). As described above, the above four exclusive OR operations are separately described by respective tables to generate conversion tables Tab0[ ] to Tab3[ ]. Thereby, an exclusive OR operation can be described by a conversion table having a table data amount (8 bits×2^8×4=1 kilobyte) which is smaller compared to the previously-described conversion table in which an arithmetic addition or an exclusive OR operation is described by a single conversion table without separation.

The above-described AES cryptography and a Data Encryption Standard (DES) cryptography use exclusive OR operations for key data in encryption, so that the operations can be described by tables with small data amounts in the manner as described above. However, these cryptography technologies still have a problem of difficulty in describing arithmetic additions by conversion tables having practical implementable data amount, due to the above-mentioned carrying of bits to a higher digit.

In order to solve the above problems, an object of the present invention is to provide a program converter and an encrypting device, which make it possible to ensure security even for encryption using arithmetic additions, against the unauthorized deciphering methods for analyzing intermediate data during execution of the encryption and specifying encryption key data, and also possible to implement such device at a practical cost.

Means to Solve the Problems

In order to achieve the above object, the program converter according to the present invention converts an encryption program for executing encryption into a converted encryption program for executing encryption equivalent to the encryption, the encryption program including arithmetic addition processing of executing an arithmetic addition on N-bit (N is an integer of 2 or more) addition-target data X and N-bit key data K and thereby obtaining key added data E as a result of the arithmetic addition. The program converter includes: a key-data separation unit operable to separate the key data K into n partial key data $k_i$ (i=0 to n−1), each of which has $N_i$ bits sequentially obtained from a most significant bit in the key data K; an addition-target-data separation unit operable to separate the addition-target data X into n partial addition-target data $x_i$ (i=0 to n−1), each of which has $N_i$ bits sequentially obtained from a most significant bit in the addition-target data X; an arithmetic-addition-table generation unit operable to generate an arithmetic addition table $add_i$; for each i (i=0 to n−1), the arithmetic addition table $add_i$ being indicated by (i) an element which is data including at least added data $y_i$, among the added data $y_i$ and carried data $c_i$ which result from an arithmetic addition on (a) the partial key data $k_i$, (b) the partial addition-target data $x_i$, (c) carried data $c_{i+1}$ of an arithmetic addition on partial key data $k_{i+1}$ and partial addition-target data $x_{i+1}$, and (ii) an index which is data including at least the partial addition-target data $x_i$, among the partial addition-target data $x_i$ and the carried data $c_{i+1}$; and a randomized-conversion-table generation unit operable to generate a randomized conversion table $RTab_i$ of each i (i=0 to n−1), by randomizing, using a random number, the arithmetic addition table $add_i$ generated by said arithmetic-addition-table generation unit.

With the above structure, in consideration of carrying of bits from a lower digit to a higher digit, a conversion encrypting program is generated to express an arithmetic addition on two N-bit data by n arithmetic addition tables. Thereby, it is possible to reduce a data amount of the arithmetic addition table, compared to a case where an arithmetic addition is described by a single conversion table. This makes it possible to implement the conversion encrypting program using arithmetic additions at a practical cost. Furthermore, with the above structure, a randomized conversion table is generated by randomizing the arithmetic addition table. Thereby, it is possible to provide a conversion encrypting program, by which security is ensured for encryption, by making it difficult to obtain the intermediate values during the execution of the encryption using various unauthorized deciphering methods, and to specify the key data K from the intermediate value.

It is preferable that the encryption program includes addition data conversion processing of executing predetermined conversion $S_i$ for each partial key added data $Z_i$, the partial key added data $Z_i$ being obtained by separating the key added data E into n partial data, each of which has $N_i$ bits sequentially obtained from a most significant bit in the key added data E (i=0 to n−1), that said randomized-conversion-table generation unit includes: a merger-table generation unit operable to generate a merger table $U_i$ of each i (i=0 to n−1), by merging the arithmetic addition table $add_i$ generated by said arithmetic-addition-table generation unit and the predetermined conversion $S_i$, so that the merger table $U_i$ has an index which is data including at least the partial addition-target data $x_i$, among the partial addition-target data $x_i$ and the carried data $c_{i+1}$; and a generation unit operable to generate a randomized conversion table $RTab_i$ of each i (i=0 to n−1), by randomizing, using the random number, the merger table $U_i$ generated by said merger-table generation unit.

With the above structure, a merger table is generated by merging the arithmetic addition table and a predetermined conversion processing. Thereby, it is possible to reduce a data amount of the table, thereby generating a conversion encrypting program implementable at a practical cost.

An encrypting device according to the present invention encrypts a plain text to generate an encrypted text. The device includes: a program conversion unit operable to convert an encryption program for executing encryption into a converted encryption program for executing encryption equivalent to the encryption; and an encrypted-text generation unit operable to encrypt the plain text to generate the encrypted text, according to the converted encryption program generated by said program conversion unit, wherein the encryption program includes arithmetic addition processing of executing an arithmetic addition on N-bit (N is an integer of 2 or more) addition-target data X and N-bit key data K and thereby obtaining key added data E as a result of the arithmetic addition, and said program conversion unit includes: a key-data separation unit operable to separate the key data K into n partial key data $k_i$ (i=0 to n−1), each of which has $N_i$ bits sequentially obtained from a most significant bit in the key data K; an addition-target-data separation unit operable to separate the addition-target data X into n partial addition-target data $x_i$ (i=0 to n−1), each of which has $N_i$ bits sequentially obtained from a most significant bit in the addition-target data X; an arithmetic-addition-table generation unit operable to generate an arithmetic addition table $add_i$; for each i (i=0 to n−1), the arithmetic addition table $add_i$ being indicated by (i) an element which is data including at least added data $y_i$, among the added data $y_i$ and carried data $c_i$ which result from an arithmetic addition on (a) the partial key data $k_i$, (b) the partial addition-target data $x_i$, (c) carried data $c_{i+1}$ of an arithmetic addition on partial key data $k_{i+1}$ and partial addition-target data $x_{i+1}$, and (ii) an index which is data including at least the partial addition-target data $x_i$, among the partial addition-target data $x_i$ and the carried data $c_{i+1}$; and a randomized-conversion-table generation unit operable to generate a randomized conversion table $RTab_i$ of each i (i=0 to n−1), by randomizing, using a random number, the arithmetic addition table $add_i$ generated by said arithmetic-addition-table generation unit.

With the above structure, the above-described randomized conversion table can be generated for each encryption. Therefore, a different randomized conversion table is generated every time a plaintext is encrypted. This makes difficult unauthorized deciphering of key data from the intermediate values, so that security of the encryption is ensured.

Another encrypting device according to the present invention performs arithmetic addition processing of executing an arithmetic addition on N-bit (N is an integer of 2 or more) addition-target data X and N-bit key data K and thereby obtaining key added data E as a result of the arithmetic addition. The device includes: an addition-target-data separation unit operable to separate the addition-target data X into n partial addition-target data $x_i$ (i=0 to n−1), each of which has $N_i$ bits sequentially obtained from a most significant bit in the addition-target data X; and a randomized-key-added-data acquisition unit operable to acquire, for each i (i=0 to n−1), a randomized key added data $re_i$ which is an element of a randomized conversion table $RTab_i$, indexes of the element including at least randomized partial addition-target data $rx_i$ which is generated by randomizing the partial addition-target data $x_i$ using a random number $ra_i$, wherein the randomized conversion table $RTab_i$ is generated by: separating the key data K into n partial key data $k_i$ (i=0 to n−1), each of which has $N_i$ bits sequentially obtained from the most significant bit in the key data K; generating an arithmetic addition table $add_i$ for each i (i=0 to n−1), the arithmetic addition table $add_i$ being indicated by (i) an element which is data including at least added data $y_i$, among the added data $y_i$ and carried data $c_i$ which result from an arithmetic addition on (a) the partial key data $k_i$, (b) the partial addition-target data $x_i$, (c) carried data $c_{i+1}$ of an arithmetic addition on partial key data $k_{i+1}$ and partial addition-target data $x_{i+1}$, and (ii) an index which is data including at least the partial addition-target data $x_i$, among the partial addition-target data $x_i$ and the carried data $c_{i+1}$; and randomizing the arithmetic addition table $add_i$ of each i (i=0 to n−1) using a random number.

With the above structure, in consideration of carrying of bits from a lower digit to a higher digit, a conversion encrypting program is generated to express an arithmetic addition on two N-bit data by n arithmetic addition tables. Thereby, it is possible to implement an encrypting device using arithmetic additions at a practical cost. This makes it possible to implement the conversion encrypting program using arithmetic additions at a practical cost. Furthermore, with the above structure, a randomized conversion table is generated by randomizing the arithmetic addition table. Thereby, it is possible to provide a conversion encrypting program, by which security is ensured for encryption, by making it difficult to obtain the intermediate values during the execution of the encryption using various unauthorized deciphering methods, and to specify the key data K from the intermediate value. Furthermore, the randomized conversion table is used to make it difficult to maliciously decipher the key data K from the intermediate values, even if the values can be obtained using various unauthorized deciphering methods, so that security of the encryption is ensured.

Note that the present invention can be implemented not only as the above-described program converter or encrypting device, but also as a program converting method or an encrypting method which includes characteristic processing executed by the program converter or the encrypting device, and as a program which causes a computer to executed the processing. Here, it is obvious that such a program can be distributed via a memory medium such as a CD-ROM, or a transmission medium such as the Internet.

Effects of the Invention

According to the program converter of the present invention, an arithmetic addition is separated into a plurality of arithmetic additions of a small data width. Here, in each of the plurality of arithmetic additions, a carry occurs. Then, these resulting operations are described in respective tables. Further, each of the arithmetic addition tables is randomized using random numbers to generate randomized conversion tables. Thereby, it is possible to reduce a data amount of the implemented conversion table more than the conventional technologies, and also to ensure security for the encryption, in order to protect the processing against the unauthorized deciphering methods for monitoring registered data during the execution of the encryption to analyze encryption key data, or the unauthorized deciphering methods for measuring electronic power consumption during the execution of the encryption to analyze encryption key data.

Figure 1:
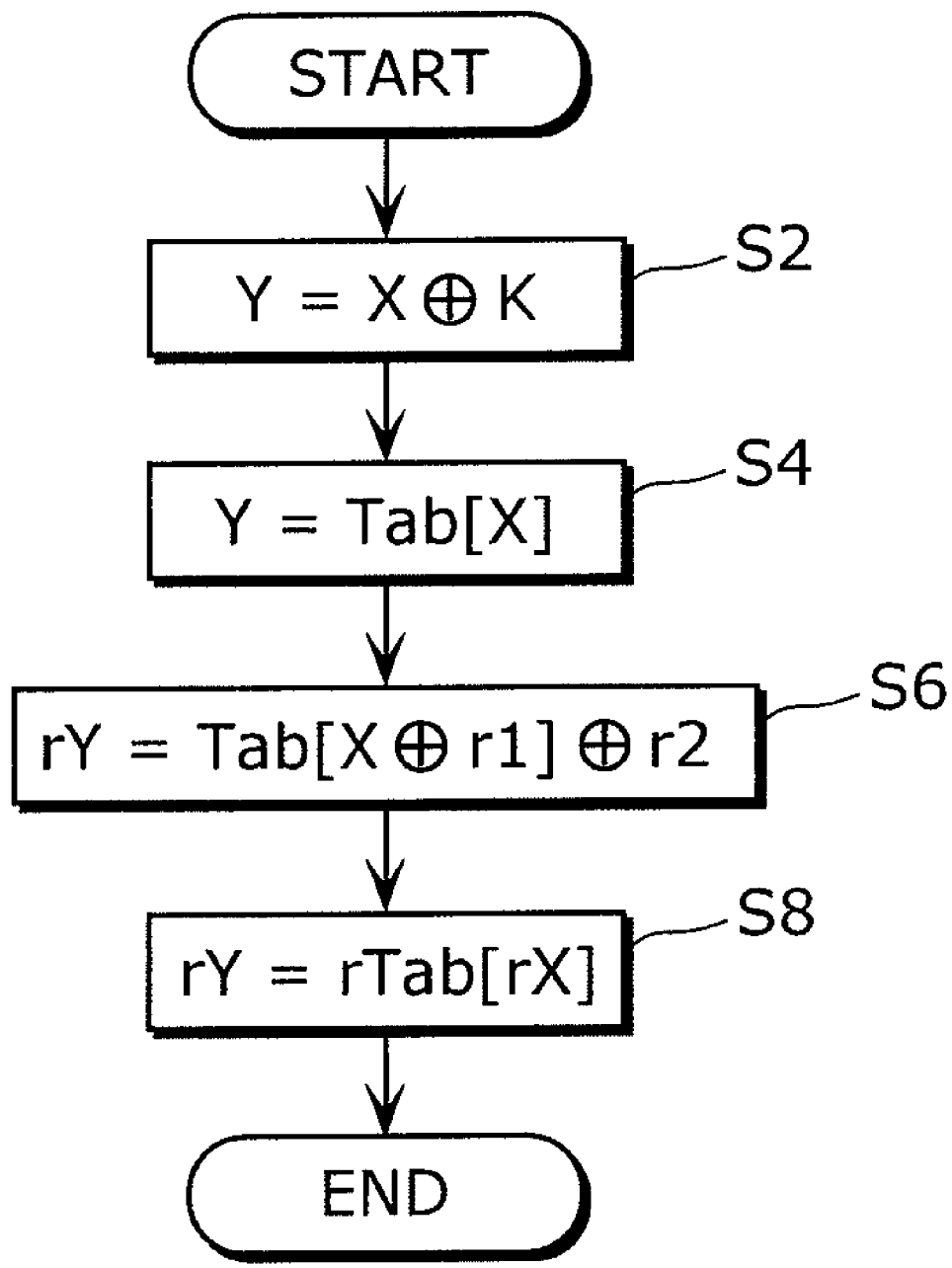
FIG. 1 is a flowchart for explaining an example of the White-Box cryptography technology.
Figure 2:
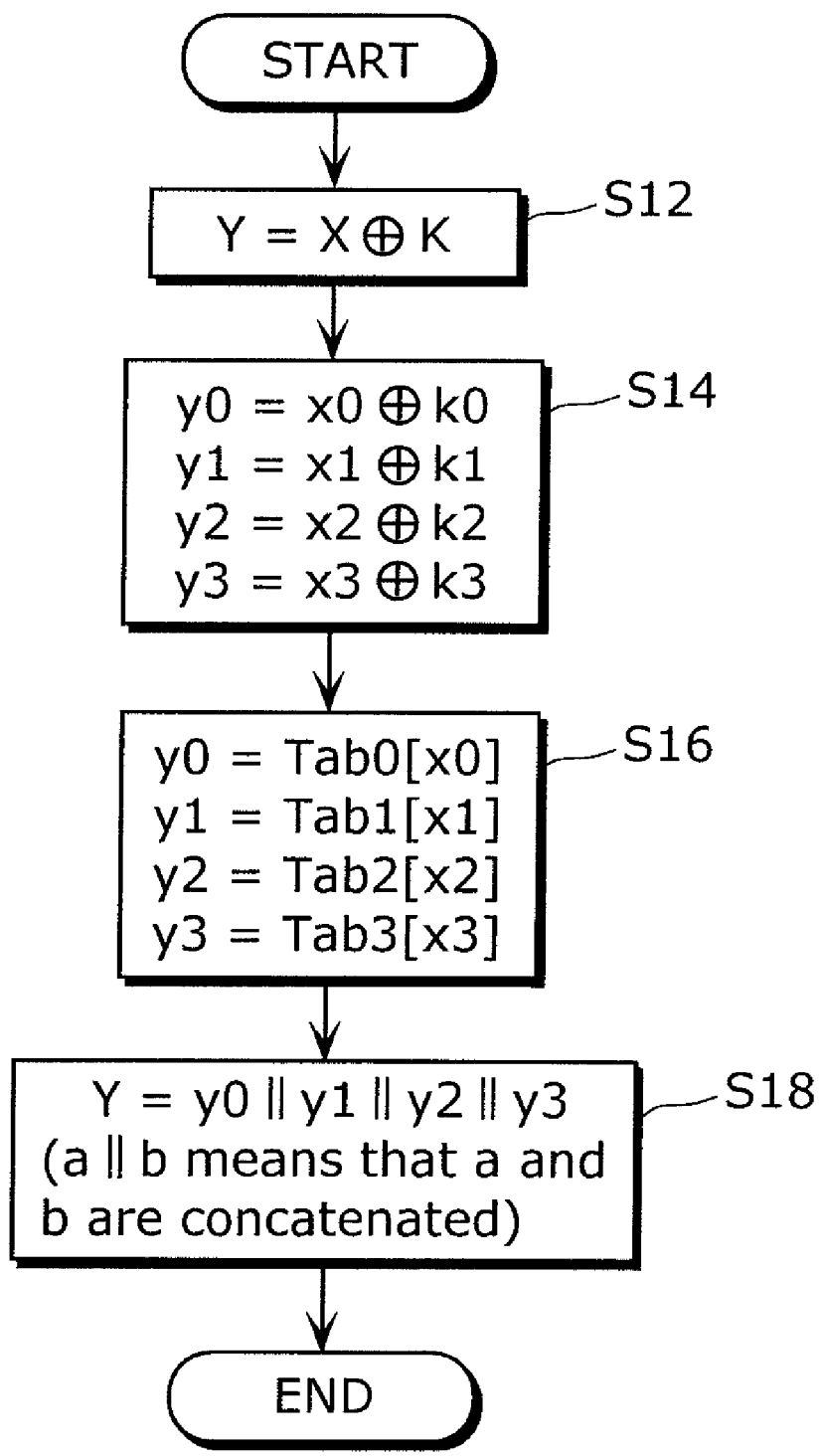
FIG. 2 is a flowchart for explaining how to describe an exclusive OR operation is described by tables.

NUMERICAL REFERENCES 1 program converter
10 key data extraction unit
11 addition table generation unit
12 conversion table extraction unit
13 table merger unit
14 random number generation unit
15 table randomization unit
16 converted-program generation unit
20, 22, 30a-30d key data adding unit
21a-21d, 23a-23d table converting unit

BEST MODE FOR CARRYING OUT THE INVENTION

The following describes the preferred embodiment according to the present invention with reference to the drawings.

<Overall Structure>

Figure 3:
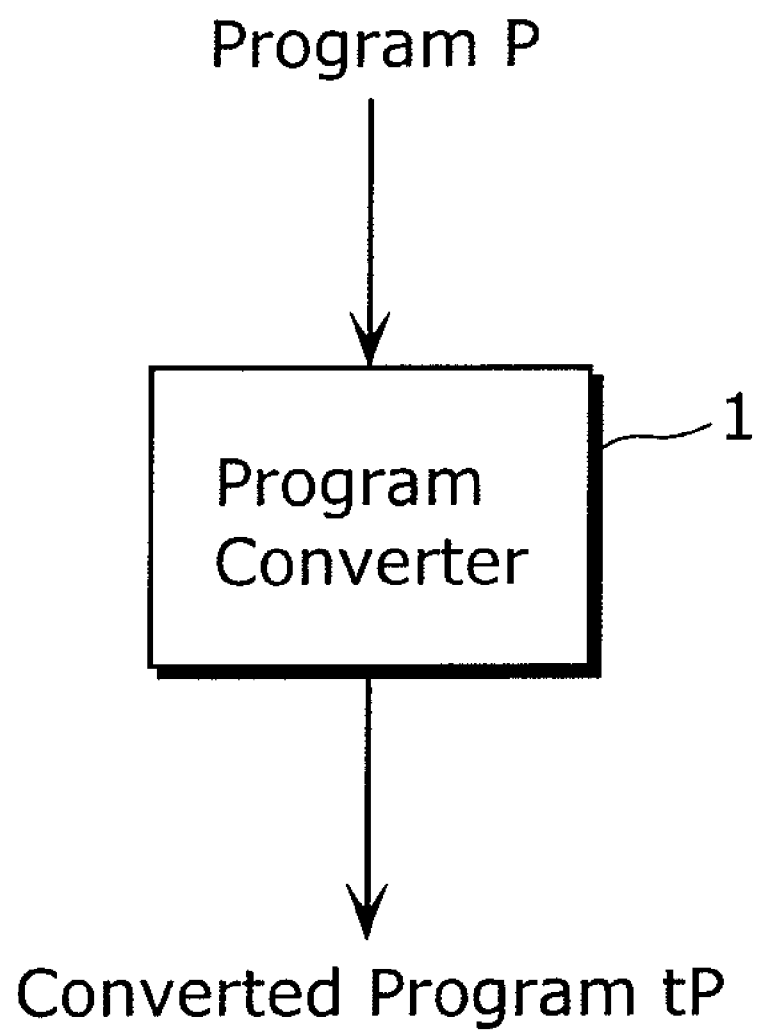
FIG. 3 is a block diagram showing a structure in which a program P is converted using the program converter according to an embodiment of the present invention.

FIG. 3 is a block diagram showing an example of a structure in which a program for executing encryption is converted by the program converter according to the embodiment of the present invention. The program converter 1 converts an encrypting program P to a converted program tP as output. Here, the program P is a program which has not been protected from the previously-described unauthorized deciphering methods of analyzing encryption key data from monitored intermediate values of the encryption execution. The converted program tP is a program which has been protected from the unauthorized deciphering methods. In the device which actually executes the encryption, this converted program tP is implemented.

<Processing of Program P>

Figure 4:
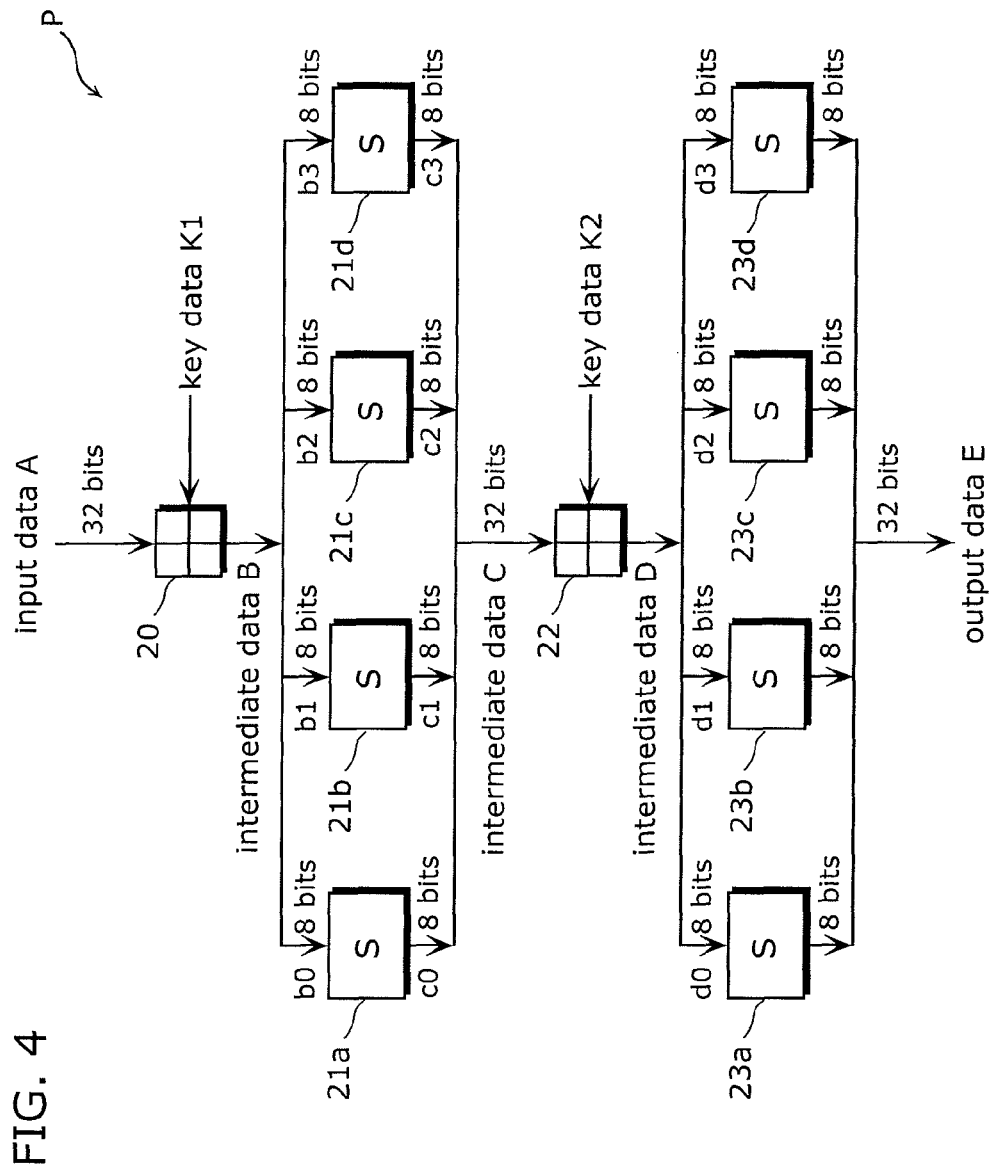
FIG. 4 is a block diagram showing a structure in which the program P executes encryption, according to the embodiment of the present invention.
Figure 5:
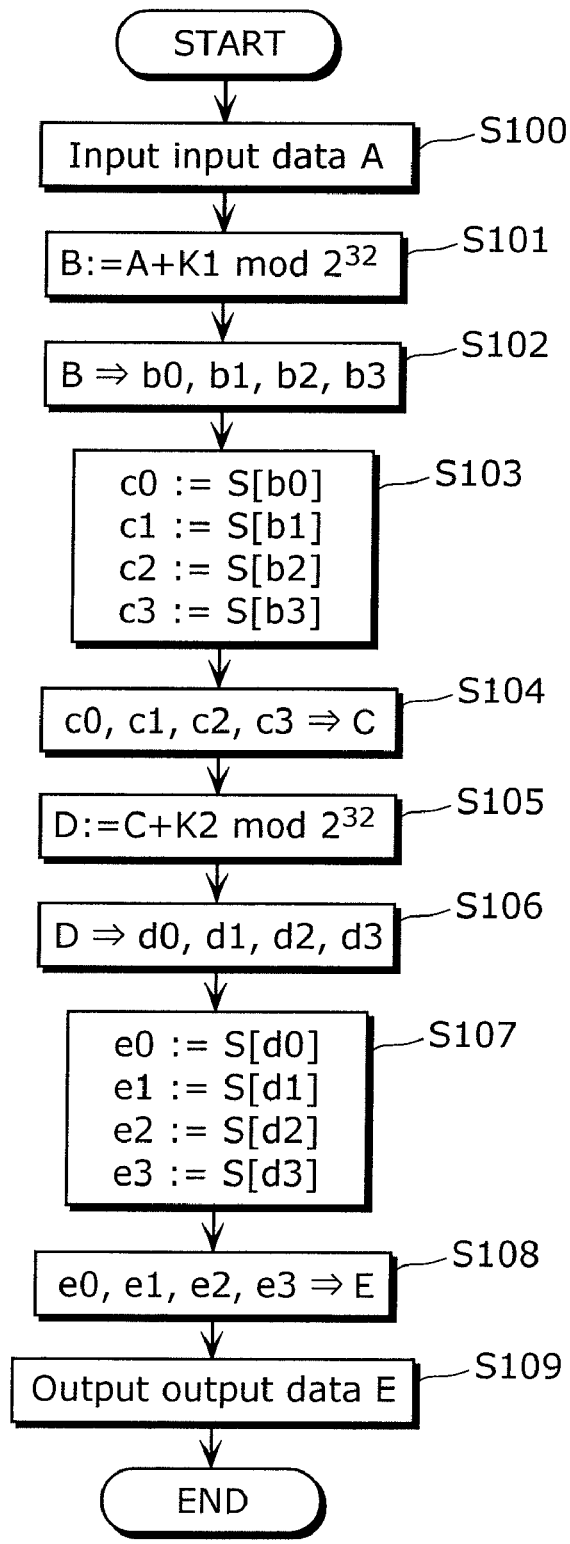
FIG. 5 is a flowchart for explaining encrypting processing executed by the program P, according to the embodiment of the present invention.

An example of the program P is described below. FIG. 4 is a block diagram showing detail processing of the program P, where each process is shown by each block. FIG. 5 is a flowchart for explaining the processing of the program P. The processing of the program P is described in detail with reference to FIGS. 4 and 5.

The program P encrypts input data A (32 bits) using key data K1 and K2 (each 32 bits), thereby producing output data E (32 bits). Here, K1 and K2 are secret fixed values set in the program P. Further, the program P previously holds an array S including 256 fixed value elements (each 8 bits). Next, the processing of the program P is described step by step.

Firstly, input data A is inputted into a key data adding unit (S100).

The key data adding unit 20 executes an arithmetic addition on the input data A and the key data K1 according to the following equation (1), thereby producing intermediate data B (S101). Note that, in the equation, (X mod α) means a remainder of X divided by α. Then, the intermediate data B is separated into 8-bit data parts sequentially from the most significant bit, thereby producing b0, b1, b2, and b3 (S102).

$$B=(A+K1)\bmod(2^{\wedge}(32)) \quad (1)$$

Table converting units 21a, 21b, 21c, and 21d execute table conversions on b0, b1, b2, and b3 using the following equations (2a) to (2d), respectively, thereby producing c0, c1, c2, and c3 (S103). Note that, in the equations, c=S[b] means that an element (8 bits) on the b-th in the array S[ ] is retrieved as c. The program P concatenates the c0, c1, c2, and c3 sequentially, and thereby produces 32-bit intermediate data C (S104).

$$c0=S[b0] \quad (2a)$$

$$c1=S[b1] \quad (2b)$$

$$c2=S[b2] \quad (2c)$$

$$c3=S[b3] \quad (2d)$$

The key data adding unit 22 executes an arithmetic addition on the intermediate data C and the key data K2 according to the following equation (3), thereby producing intermediate data D (S105). Then, the program P separates the intermediate data D into 8-bit data parts sequentially from higher-order bits, producing d0, d1, d2, and d3 (S106).

$$D=(C+K2)\bmod(2^{\wedge}(32)) \quad (3)$$

Table converting units 23a, 23b, 23c, and 23d execute table conversions on d0, d1, d2, and d3 using the following equations (4a) to (4d), respectively, thereby producing e0, e1, e2, and e3 (S107). The program P concatenates the e0, e1, e2, and e3 sequentially, and thereby produces 32-bit data E (S108).

$$e0=S[d0] \quad (4a)$$

$$e1=S[d1] \quad (4b)$$

$$e2=S[d2] \quad (4c)$$

$$e3=S[d3] \quad (4d)$$

The program P outputs the 32-bit data E as output data E (S109).

<Structure of Program Converter 1>

Figure 6:
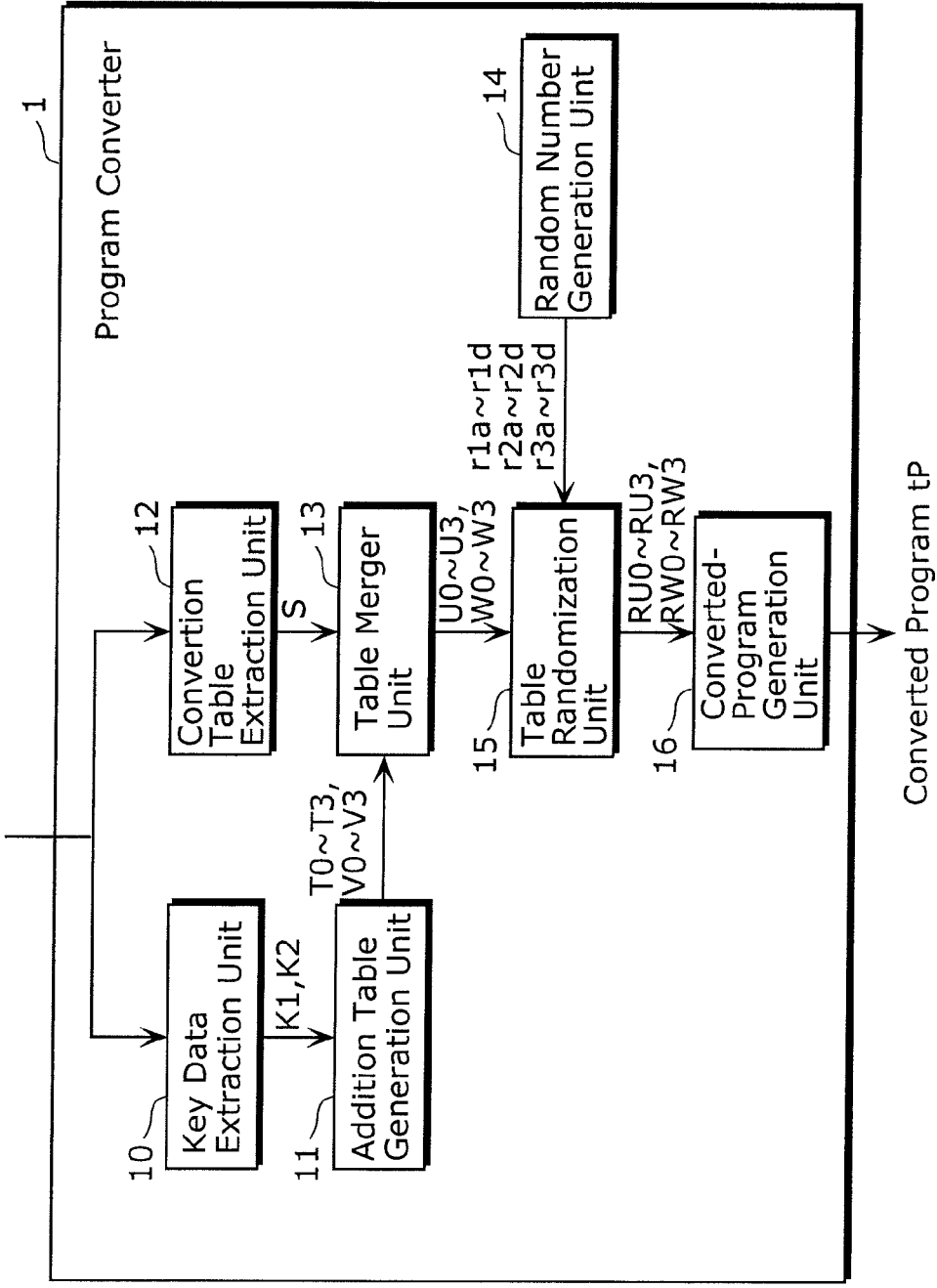
FIG. 6 is a block diagram showing a structure of the program converter, according to the embodiment of the present invention.

Next, a structure of the program converter 1 is described. FIG. 6 is a block diagram showing an example of an internal structure of the program converter 1.

The program converter 1 is a device which converts the encrypting program P into a converted program tP. The converted program tP has tamper resistance and describes encryption by a table having a practical implementable data amount. The program converter 1 includes a key data extraction unit 10, an addition table generation unit 11, a conversion table extraction unit 12, a table merger unit 13, a random number generation unit 14, a table randomization unit 15, and a converted-program generation unit 16.

The key data extraction unit 10 is a processing unit which extracts key data from the inputted program P.

The addition table generation unit 11 is a processing unit which generates an addition table using the key data extracted by the key data extraction unit 10.

The conversion table extraction unit 12 is a processing unit which extracts a conversion table from the program P.

The table merger unit 13 is a processing unit which merges the addition table generated by the addition table generation unit 11 and the conversion table extracted by the conversion table extraction unit 12, and thereby generates a merger table.

The random number generation unit 14 is a processing unit which generates random numbers.

The table randomization unit 15 is a processing unit which randomizes the merger table generated by the table merger unit 13, using random numbers generated by the random number generation unit 14, and thereby generates a randomized merger table.

Figure 7:
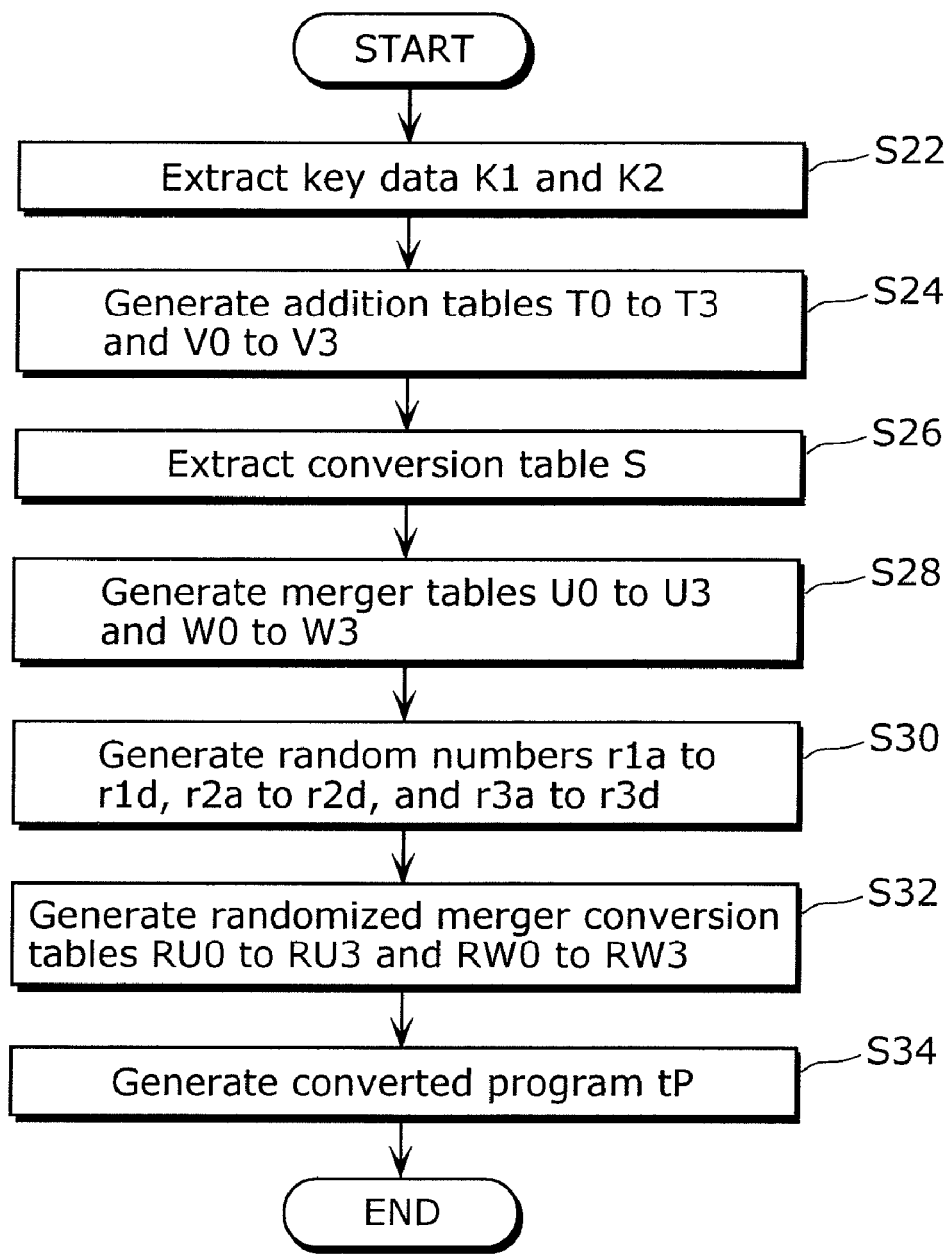
FIG. 7 is a flowchart for explaining processing executed by the program converter, according to the embodiment of the present invention.

The converted-program generation unit 16 is a processing unit which generates a converted program tP according to the randomized merger table generated by the table randomization unit Next, the processing executed by the program converter 1 is described. FIG. 7 is a flowchart for explaining the processing executed by the program converter.

Firstly, the key data extraction unit 10 extracts key data K1 and K2 from the inputted program P, and provides the data to the addition table generation unit 11 (S22).

The addition table generation unit 11 generates addition tables T0 to T3 using the key data K1, and addition tables V0 to V3 using the key data K2 (S24). The generating of the addition tables is described in detail below. The following explanation is given for the generating of the addition tables T0 to T3 using the key data K1. In the same manner, the generating of the addition tables V0 to V3 using the key data K2 is executed.

<Processing by Addition Table Generation Unit 11 (S24 of FIG. 7)>

The key data adding unit 20 in the program P shown in FIG. 4 executes an arithmetic addition $(A+K1) \mod(2^{32})$ on input data A (32 bits) and fixed-valued key data K1 (32 bits), and eventually produces intermediate data B (32 bits). When this operation by the key data adding unit 20 is merely replaced to table conversion, the resulting conversion table has the input data A as input and the intermediate data B as output. Here, each of the input data A and the intermediate data B is data having 32 bits. As a result, a data amount of the generated conversion tables reaches as large as 32 bits×2^(32)=16 gigabytes. In order to solve this problem, the present invention realizes the same operation using tables whose data amount is smaller, according to the following principles.

Figure 8:
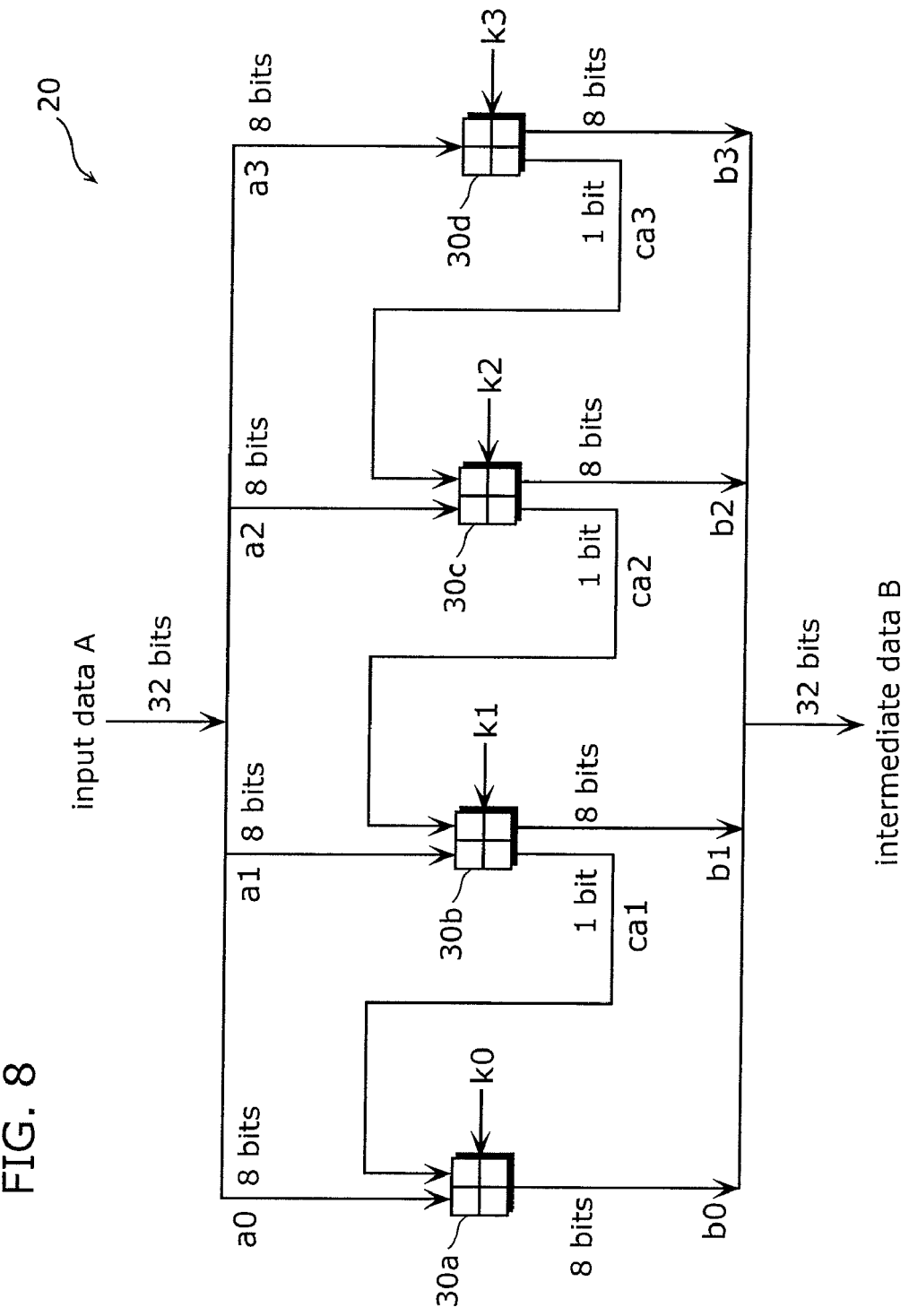
FIG. 8 is a block diagram showing another structure of a key data adding unit, according to the embodiment of the present invention.

Firstly, the addition table generation unit 11 changes the structure of the key data addition unit 20 whose functions are equivalent to the functions of an structure shown in FIG. 8. In the structure shown in FIG. 8, a 32-bit arithmetic addition of the key data addition unit 20 is separated into four 8-bit arithmetic additions, in consideration of carrying of bits to a high-order digit. More specifically, the addition table generation unit 11 separates, in FIG. 8, the input data A (32 bits) into data parts (each 8 bits) sequentially from higher-order bits, thereby producing a0, a1, a2, and a3 (each 8 bits). Likewise, the addition table generation unit 11 separates the key data K1 (32 bits) into data parts (each 8 bits) sequentially from higher-order bits, thereby producing k0, k1, k2, and k3. The key data adding unit 30d is a processing unit which executes an arithmetic addition on a3 and k3, thereby producing b3 of the lower 8 bits and ca3 of the higher 1 bit. The key data adding unit 30c is a processing unit which executes an arithmetic addition on a2, k2, and ca3, thereby producing data b2 of the lower 8 bits and ca2 of the higher 1 bit. The key data adding unit 30b is a processing unit which executes an arithmetic addition on a1, k1, and ca2, thereby producing b1 of the lower 8 bits and ca1 of the higher 1 bit. The key data adding unit 30a is a processing unit which executes an arithmetic addition on a0 and ca1, thereby producing b0 of the lower 8 bits.

Figure 9:
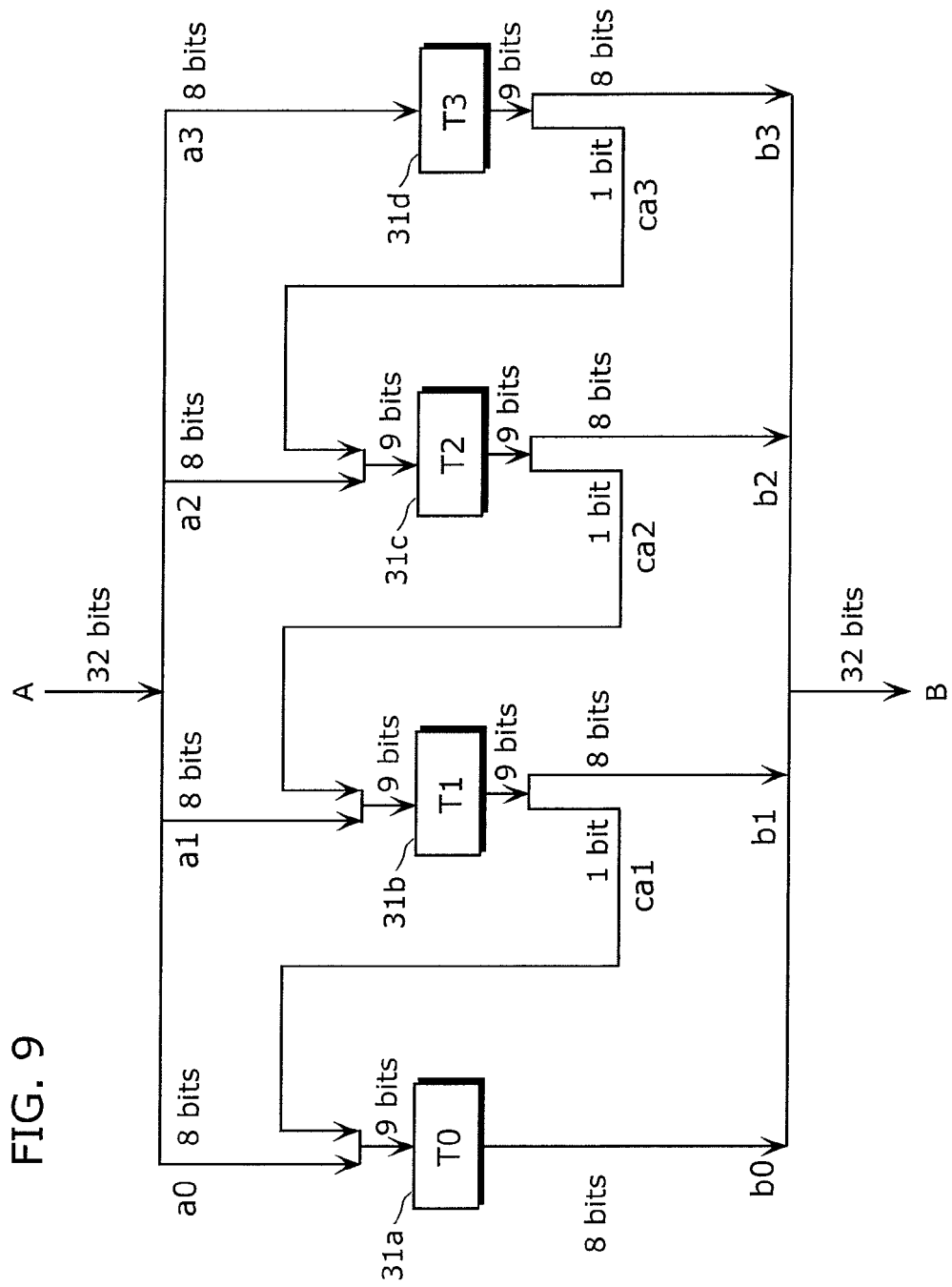
FIG. 9 is a block diagram showing still another structure of the key data adding unit, according to the embodiment of the present invention.

Next, the addition table generation unit 11 in FIG. 8 describes these operations of the key data adding units 30a, 30b, 30c, and 30d by respective addition tables T0, T1, T2, and T3 as shown in FIG. 9. Here, the addition tables T0, T1, T2, and T3 are tables having 512 array elements (each 8 bits), 512 array elements (each 9 bits), 512 array elements (each 9 bits), and 256 array elements (each 9 bits), respectively. The array elements are determined according to the following equations (5a), (5b), (5c), and (5d), respectively. Thereby, the operation of the key data adding unit 20 can be described by four addition tables (conversion tables) whose total data amount is small as 8 bits×2^9+9 bits×2^9+9 bits×2^9+9 bits×2^8=about 1.9 kilobytes.

$$T0[x] = ((\text{higher 8 bits of } x) + (\text{lower 1 bit of } x) + k0) \mod (2^8) \text{ (where } x=0, 1, \ldots, 511) \quad (5a)$$

$$T1[x] = ((\text{higher 8 bits of } x) + (\text{lower 1 bit of } x) + k1) \mod (2^9) \text{ (where } x=0, 1, \ldots, 511) \quad (5b)$$

$$T2[x] = ((\text{higher 8 bits of } x) + (\text{lower 1 bit of } x) + k2) \mod (2^9) \text{ } (x=0, 1, \ldots, 511) \quad (5c)$$

$$T3[x] = (x+k3) \mod (2^9) \text{ (where } x=0, 1, \ldots, 255) \quad (5d)$$

In summary, the addition table generation unit 11 generates addition tables T0, T1, T2, and T3 from the key data K1, according to the above four equations. Likewise, the operation of the key data addition unit 22 is described by addition tables V0, V1, V2, and V3. Then, the resulting addition tables T0, T1, T2, and T3, and V0, V1, V2, and V3 are provided to the table merger unit 13.

<Processing by Conversion Table Extraction Unit 12>

The conversion table extraction unit 12 extracts array elements (8 bits×256) in the conversion table S from the program P, to be provided to the table merger unit 13 (S26 of FIG. 7).

<Processing by Table Merger Unit 13>

The table merger unit 13 merges: the addition table T0 and the conversion table S; the addition table T1 and the conversion table S; the addition table T2 and the conversion table S; and the addition table T3 and the conversion table S, respectively, and thereby generates merger tables U0, U1, U2, and U3. Likewise, the table merger unit 13 also merges: the addition table V0 and the conversion table S; the addition table V1 and the conversion table S; the addition table V2 and the conversion table S; and the addition table V3 and the conversion table S, respectively, and thereby generates merger tables W0, W1, W2, and W3 (S28 of FIG. 7). The following explanation is given for the generating of the merger tables U0, U1, U2, and U3 (S28 of FIG. 7). In the same manner, the generating of the merger tables W0, W1, W2, and W3 is executed.

Figure 10:
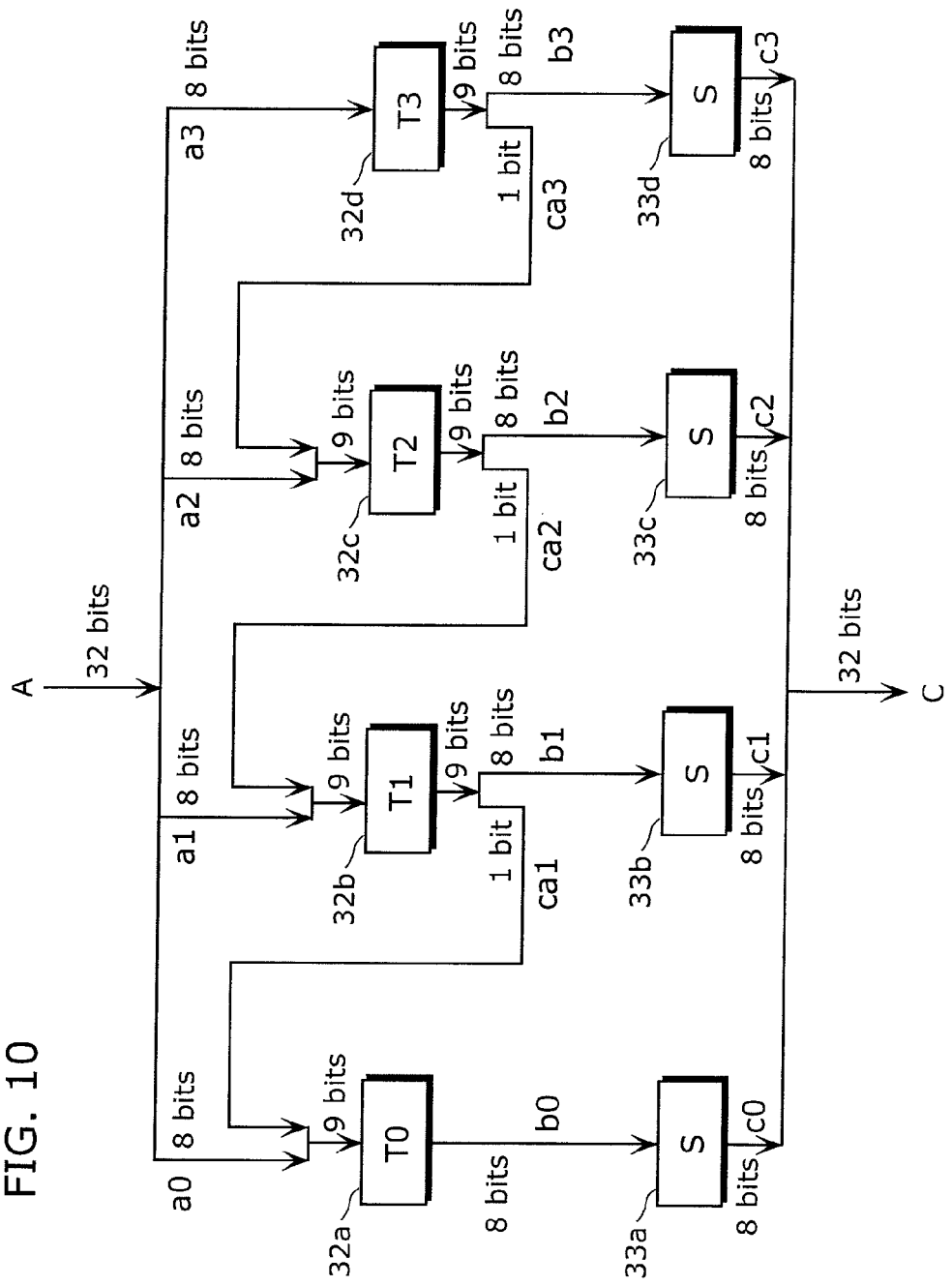
FIG. 10 is a block diagram showing still another structure of the key data adding unit, according to the embodiment of the present invention.

FIG. 10 is a block diagram showing a part from the encryption processing which is executed by the program P shown in FIG. 4. The part includes the key data adding unit 20 and the table converting units 21a, 21b, 21c, and 21d. Here, the key data adding unit 20 is replaced by the addition tables T0, T1, T2, and T3, using the above-described table generation (S24 of FIG. 7). Note that the table converting units 33a, 33b, 33c, and 33d are the same as the table converting units 21a, 21b, 21c, and 21d of FIG. 4. In this case, the table merger unit 13 merges: the table converting unit 32a (T0) and the table converting unit 33a (S); the table converting unit 32b (T1) and the table converting unit 33b (S); the table converting unit 32c (T2) and the table converting unit 33c (S); and the table converting unit 32d (T3) and the table converting unit 33d (S), respectively, and thereby replaces them by merger table converting units 34a (U0), 34b (U1), 34c (U2), and 34d (U3).

Figure 11:
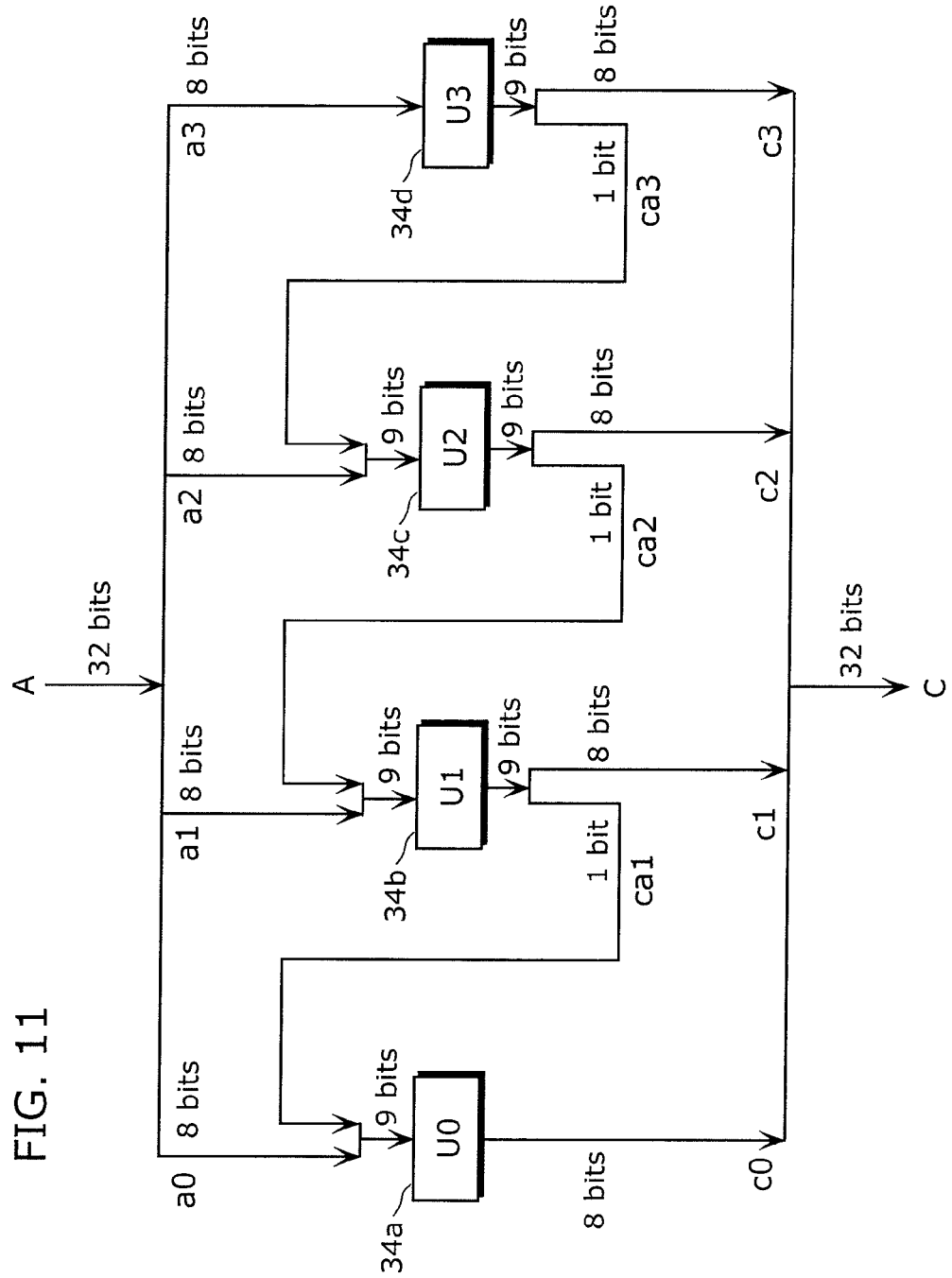
FIG. 11 is a block diagram showing another structure of the key data adding unit whose functions are equivalent to the functions of FIG. 10.

FIG. 11 is a block diagram showing the structure after the replacement. Here, array elements of the merger tables U0, U1, U2, and U3 are determined by the following equations (6a), (6b), (6c), and (6d), respectively. Note that (X∥Y) means that data X, which is higher-order bits, and data Y, which is lower-order bits, are concatenated. |

$$U0[x] = S[T0[x]] \text{ } (x=0, 1, \ldots, 511) \quad (6a)$$

$$U1[x] = (1 \text{ most significant bit of } T1[x]) \| S(8 \text{ lower-order bits of } T1[x]) \text{ } (x=0, 1, \ldots, 511) \quad (6b)$$

$$U2[x]=(\text{1 most significant bit of } T2[x])\|S(\text{8 lower-order bits of } T2[x]) \ (x=0, 1, \ldots, 511) \quad (6c)$$

$$U3[x]=(\text{1 most significant bit of } T3[x])\|S(\text{8 lower-order bits of } T3[x]) \ (x=0, 1, \ldots, 255) \quad (6d)$$

In summary, the table merger unit 13 generates the merger tables U0, U1, U2, and U3 from the addition tables T0, T1, T2, and T3 and the conversion table S, according to the above four equations. Likewise, the table merger unit 13 generates merger tables W0, W1, W2, and W3 from the addition tables V0, V1, V2, and V3 and the conversion table S. Then, the table merger unit 13 provides the generated merger tables U0, U1, U2, U3, W0, W1, W2, and W3 to the table randomization unit 15 (S28 of FIG. 7).

<Processing by Random Number Generation Unit 14>

The random number generation unit 14 generates twenty random numbers r1a (9 bits), r1b (9 bits), r1c (9 bits), r1d (8 bits), r2a (8 bits), r2b (8 bits), r2c (8 bits), r2d (8 bits), r3a (8 bits), r3b (9 bits), r3c (9 bits), and r3d (9 bits), and provides the random numbers to the table randomization unit 15 (S30 of FIG. 7).

<Processing by Table Randomization Unit 15>

The table randomization unit 15 randomizes the merger tables U0, U1, U2, U3, W0, W1, W2, and W3 using the twenty random numbers generated by the random number generation unit 14, and thereby generates the randomized merger conversion tables RU0, RU1, RU2, RU3, RW0, RW1, RW2, and RW3 (S32 of FIG. 7). The following explanation is given for the generating of the randomized merger conversion tables RU0, RU1, RU2, and RU3 (S32 of FIG. 7). In the same manner, the generating of the randomized merger conversion tables RW0, RW1, RW2, and RW3 is executed.

Figure 12:
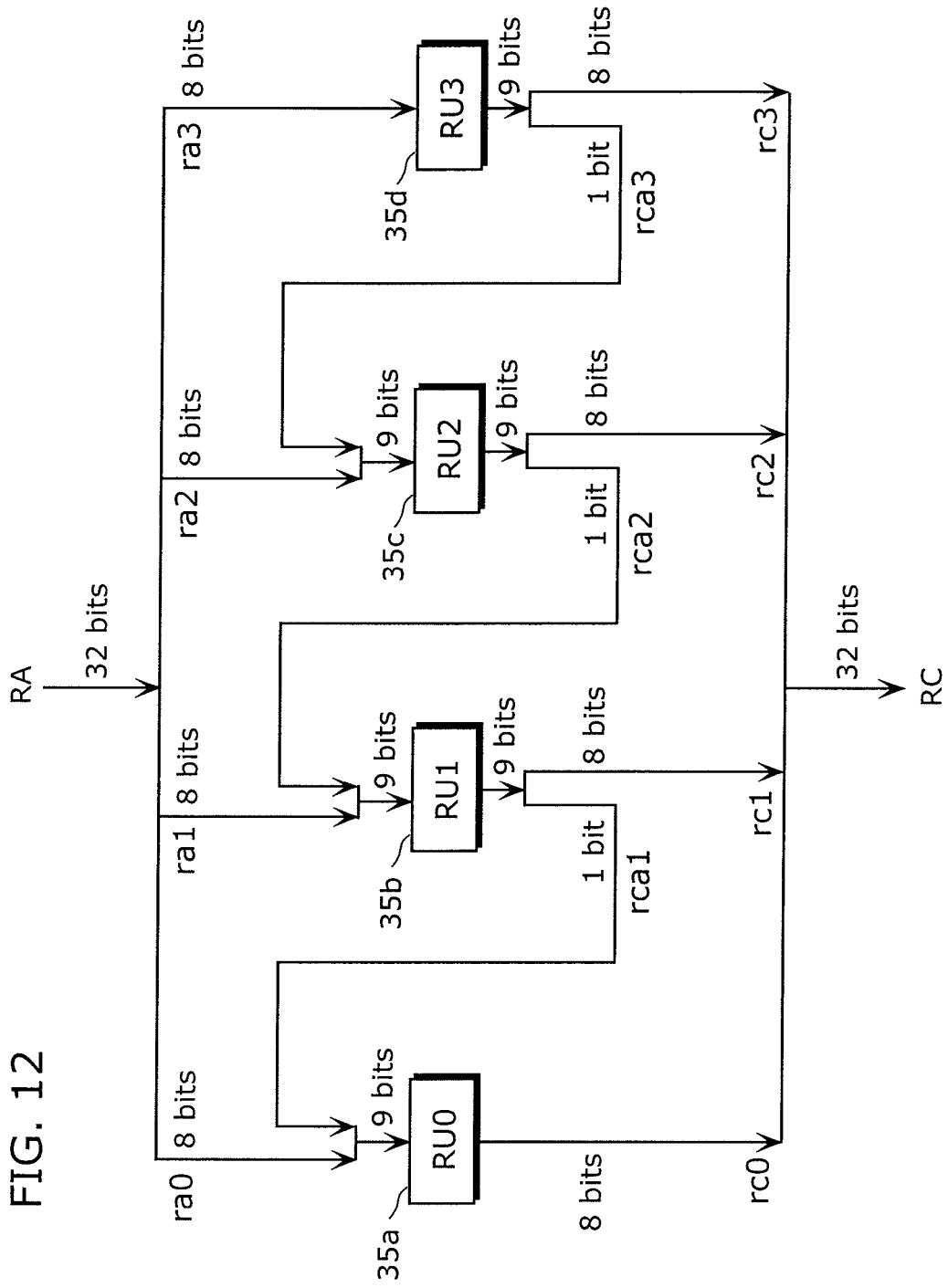
FIG. 12 is a block diagram showing a structure in which a merger table converting unit shown in FIG. 11 is randomized.

FIG. 12 is a block diagram showing a structure in which the merger tables U0, U1, U2, and U3 in the merger table converting units 34a, 34b, 34c, and 34d shown in FIG. 11 are randomized using random numbers r1a (9 bits), r1b (9 bits), r1c (9 bits), r1d (8 bits), r2a (8 bits), r2b (8 bits), r2c (8 bits), and r2d (8 bits) and thereby replaces the merger tables U0, U1, U2, and U3 by the randomized merger conversion tables RU0, RU1, RU2, and RU3. In FIG. 12, the randomizing merger table converting units 35a, 35b, 35c, and 35d are table conversion processing using the randomized merger conversion tables RU0, RU1, RU2, and RU3, respectively. Here, array elements of the randomized merger conversion tables RU0, RU1, RU2, and RU3 are determined by the following equations (7a), (7b), (7c), and (7d), respectively.

$$RU0[x]=U0[x(+)r1a](+)r2a \ (x=0, 1, \ldots, 511) \quad (7a)$$

$$RU1[x]=U1[x(+)r1b](+)\{(\text{1 least significant bit of } r1a)\|r2b\} \ (x=0, 1, \ldots, 511) \quad (7b)$$

$$RU2[x]=U2[x(+)r1c](+)\{(\text{1 least significant bit of } r1b)\|r2c\} \ (x=0, 1, \ldots, 511) \quad (7c)$$

$$RU3[x]=U3[x(+)r1d](+)\{(\text{1 least significant bit of } r1c)\|r2d\} \ (x=0, 1, \ldots, 255) \quad (7d)$$

Figure 13:
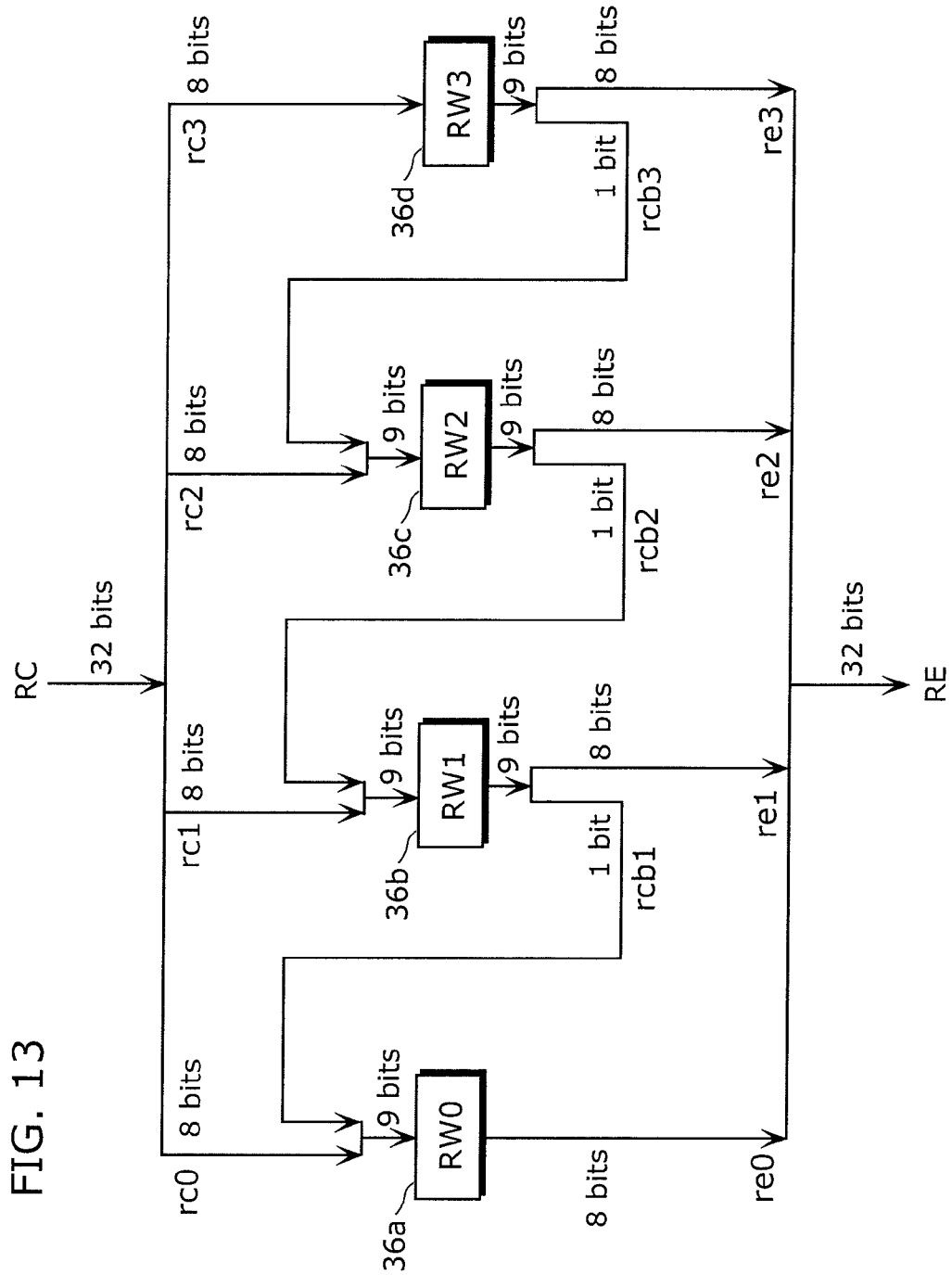
FIG. 13 is a block diagram showing a structure in which the merger table converting unit according to the embodiment of the present invention is randomized.

FIG. 13 is a block diagram showing a structure in which the merger tables W0, W1, W2, and W3 are randomized using the random numbers r2a (8 bits), r2b (8 bits), r2c (8 bits), r2d (8 bits), r3a (8 bits), r3b (9 bits), r3c (9 bits), and r3d (9 bits), and thereby replaces the merger tables W0, W1, W2, and W3 by randomized merger conversion tables RW0, RW1, RW2, and RW3.

In FIG. 13, the randomizing merger table converting units 36a, 36b, 36c, and 36d are table conversion processing using the randomized merger conversion tables RW0, RW1, RW2, and RW3, respectively. Here, array elements of the randomized merger conversion tables RW0, RW1, RW2, and RW3 are determined by the following equations (8a), (8b), (8c), and (8d), respectively.

$$RW0[x]=V0[x(+)\{r2a\|(\text{1 most significant bit of } r3b)\}](+)r3a \ (x=0, 1, \ldots, 511) \quad (8a)$$

$$RW1[x]=V1[x(+)\{r2b\|(\text{1 most significant bit of } r3c)\}](+)r3b \ (x=0, 1, \ldots, 511) \quad (8b)$$

$$RW2[x]=V2[x(+)\{r2c\|(\text{1 most significant bit of } r3d)\}](+)r3c \ (x=0, 1, \ldots, 511) \quad (8c)$$

$$RW3[x]=V3[x(+)r2d](+)r3d \ (x=0, 1, \ldots, 255) \quad (8d)$$

In summary, the table randomization unit 15 generates the randomized merger conversion tables RU0, RU1, RU2, and RU3, using the merger tables U0, U1, U2, and U3 and the random numbers r1a, r1b, r1c, r1d, r2a, r2b, r2c, and r2d, according to the equations (7a) to (7d). Likewise, the table randomization unit 15 generates the randomized merger conversion tables RW0, RW1, RW2, and RW3, using the merger tables W0, W1, W2, and W3 and the random numbers r2a, r2b, r2c, r2d, r3a, r3b, r3c, and r3d, according to the equations (8a) to (8d). Then, the generated randomized merger conversion tables RU0, RU1, RU2, RU3, RW0, RW1, RW2, and RW3 are provided to the converted-program generation unit 16 (S32 of FIG. 7).

<Processing by Converted-Program Generation Unit 16>

Figure 14:
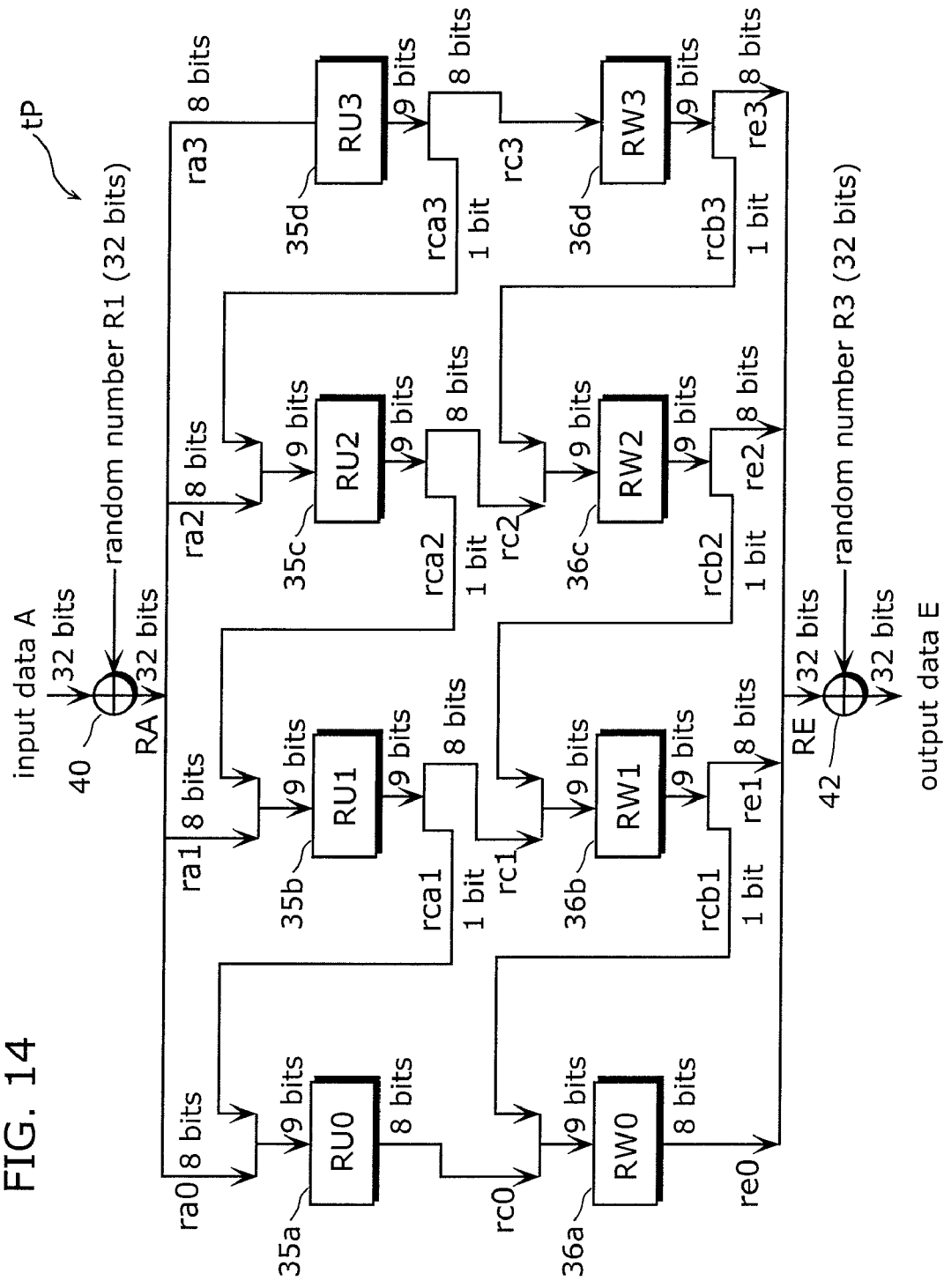
FIG. 14 is a block diagram showing each processing executed by a converted program tP, according to the embodiment of the present invention.
Figure 15:
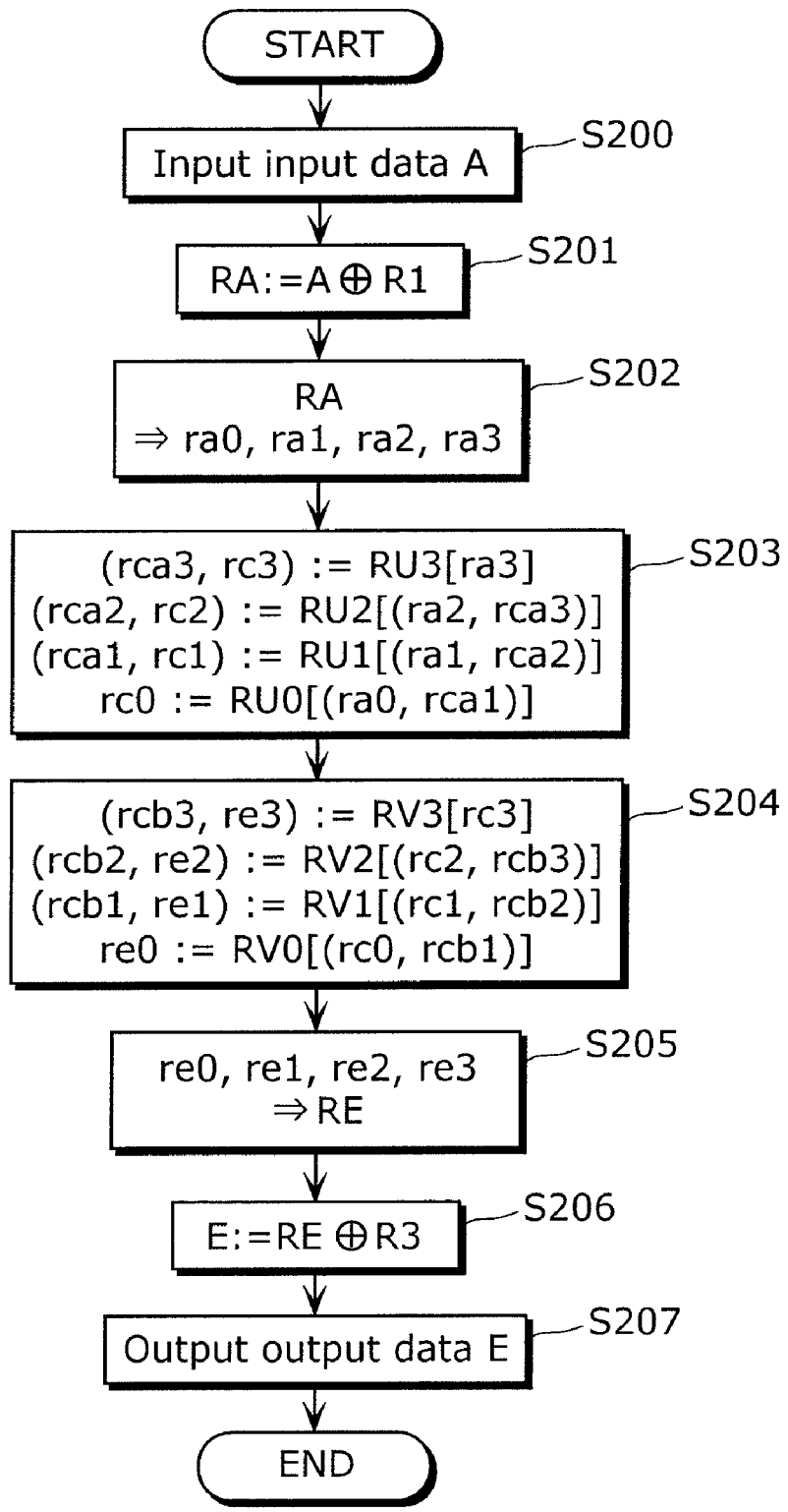
FIG. 15 is a flowchart for explaining each processing executed by the converted program tP, according to the embodiment of the present invention.

The converted-program generation unit 16 generates the converted program tP using the randomized merger conversion tables RU0, RU1, RU2, RU3, RW0, RW1, RW2, and RW3 (S34 of FIG. 7). FIG. 14 is a block diagram showing processing of the converted program tP, where each process is shown by each block, and FIG. 15 is a flowchart for explaining the processing of the program tP. In the converted program tP, the randomized merger conversion tables RU0, RU1, RU2, RU3, RW0, RW1, RW2, and RW3 which have been generated in the above-described processing are set. Furthermore, random numbers R1 (32 bits) and R3 (32 bits), which are set by the following equations (9a) and (9b), are also set in the converted program tP.

$$R1=(\text{8 higher-order bits of } r1a)\|(\text{8 higher-order bits of } r1b)\|(\text{8 higher-order bits of } r1c)\|(r1d) \quad (9a)$$

$$R3=(r3a)\mu(\text{8 lower-order bits of } r3b)\|(\text{8 lower-order bits of } r3c)\|(\text{8 lower-order bits of } r3d) \quad (9b)$$

The following describes the processing of the tP in detail with reference to FIGS. 14 and 15.

Firstly, input data A (32 bits) is inputted into the program tP (S200).

The input data randomizing unit 40 executes an exclusive OR operation on the input data A and the random number R1, and thereby produces a randomized input data RA (S201). In other words, calculation according to the following equation (10) is executed.

$$RA=A(+)R1 \quad (10)$$

The converted program tP separates the randomized input data RA into 8-bit data parts sequentially from higher-order bits, thereby producing ra0, ra1, ra2, and ra3 (S202).

The randomizing merger table converting units 35a, 35b, 35c, 35d execute calculation for ra0, ra1, ra2, and ra3 according to the following equations (11a) to (11j), respectively, thereby producing randomized intermediate data rc0, rc1, rc2, and rc3.

The generated randomized intermediate data rc0, rc1, rc2, and rc3 are provided to the randomizing merger table converting units 36a, 36b, 36c, and 36d, respectively (S203).

$$t3 = RU3[ra3] \quad (11a)$$

$$rc3 = (8 \text{ lower-order bits of } t3) \quad (11b)$$

$$rca3 = (1 \text{ most significant bit of } t3) \quad (11c)$$

$$t2 = RU2[ra2 \| rca3] \quad (11d)$$

$$rc2 = (8 \text{ lower-order bits of } t2) \quad (11e)$$

$$rca2 = (1 \text{ most significant bit of } t2) \quad (11f)$$

$$t1 = RU1[ra1 \| rca2] \quad (11g)$$

$$rc1 = (8 \text{ lower-order bits of } t1) \quad (11h)$$

$$rca1 = (1 \text{ most significant bit of } t1) \quad (11i)$$

$$rc0 = RU0[ra1 \| rca1] \quad (11j)$$

The randomizing merger table converting units 36a, 36b, 36c, and 36d executes calculation for the randomized intermediate data rc0, rc1, rc2, and rc3 sequentially according to the following equations (12a) to (12j), respectively, and thereby produces randomized output data re0, re1, re2, and re3 (S204).

$$t3 = RW3[rc3] \quad (12a)$$

$$re3 = (8 \text{ lower-order bits of } t3) \quad (12b)$$

$$rcb3 = (1 \text{ most significant bit of } t3) \quad (12c)$$

$$t2 = RW2[rc2 \| rcb3] \quad (12d)$$

$$re2 = (8 \text{ lower-order bits of } t2) \quad (12e)$$

$$rcb2 = (1 \text{ most significant bit of } t2) \quad (12f)$$

$$t1 = RW1[rc1 \| rcb2] \quad (12g)$$

$$re1 = (8 \text{ lower-order bits of } t1) \quad (12h)$$

$$rcb1 = (1 \text{ higher-order bit of } t1) \quad (12i)$$

$$re0 = RW0[rc1 \| rcb1] \quad (12j)$$

The converted program tP concatenates the randomized output data re0, re1, re2, and re3 sequentially in this order from higher-order bits, and thereby produces 32-bit randomized output data RE (S205).

The exclusive OR unit 42 executes an exclusive OR operation on the randomized output data RE and the random number R3 according to the following equation (13), and thereby produces output data E (S206).

$$E = RE(+)R3 \quad (13)$$

The converted program tP outputs the output data E (S207).

<Relationship Between Processing of Program tP and Processing of Program P>

Herein below, it will be explained that encryption executed by the converted program tP is equivalent to encryption executed by the program P. In other words, it will be explained that the output data E obtained by processing arbitrary input data A using the program P is equivalent to the output data E obtained by processing the arbitrary input data A using the program tP.

Firstly, according to the equation (10), $$RA = A(+)R1.$$

Here, when A is separated into 8-bit data parts sequentially from higher-order bits to obtain a0, a1, a2, and a3, relationships represented by the following equations (14a) to (14d) are obtained using the equation (9a).

$$ra0 = a0(+)(8 \text{ higher-order bits of } r1a) \quad (14a)$$

$$ra1 = a1(+)(8 \text{ higher-order bits of } r1b) \quad (14b)$$

$$ra2 = a2(+)(8 \text{ higher-order bits of } r1c) \quad (14c)$$

$$ra3 = a3(+)r1d \quad (14d)$$

Next, the following equation (15) is derived from the equation (11a), the equation (7d), the equation (14d), and the equation (6d).

$$\begin{aligned} t3 &= RU3[ra3] \\ &= U3[ra3(+)r1d](+)\{1 \text{ least significant bit of } r1c \| r2d\} \\ &= U3[a3](+)\{1 \text{ least significant bit of } r1c \| r2d\} \\ &= \{(1 \text{ most significant bit of } T3[a3]) \| S[8 \text{ lower-order} \\ &\quad \text{bits of } T3[a3]]\}(+)\{[1 \text{ least significant bit of } r1c) \| r2d\} \end{aligned} \quad (15)$$

Thereby, the following equation (16) is derived from the equation (15), the equation (11b), and the equation (5d).

$$\begin{aligned} rc3 &= S[8 \text{ lower-order bits of } T3[a3]](+)r2d \\ &= S[(a3+k3) \bmod (2^\wedge 8)](+)r2d \end{aligned} \quad (16)$$

Further, the following equation (17) is derived from the equation (15), the equation (11c), and the equation (5d).

$$\begin{aligned} rca3 &= (1 \text{ most significant bit of } T3[a3])(+) \\ &\quad (1 \text{ least significant bit of } r1c) \\ &= \{(1 \text{ most significant bit of } ((a3+k3) \bmod (2^\wedge 9))\}(+) \\ &\quad (1 \text{ least significant bit of } r1c) \end{aligned} \quad (17)$$

Here, $\{(1 \text{ most significant bit of } ((a3+k3) \bmod (2^\wedge 9))\}$ is a carry (0 or 1) to a high-order byte in byte data addition (a3+k3), so that, if this carry is hereinafter represented as "carry 3", the equation (17) can be expressed at the following equation (18).

$$rca3 = \text{carry3}(+)(1 \text{ least significant bit of } r1c) \quad (18)$$

Next, the following equation (19) is derived from the equation (11d), the equation (14c), the equation (18), the equation (7c), and the equation (6c).

$$\begin{aligned} t2 &= RU2[ra2 \| rca3] \\ &= RU2[\{a2(+)(8 \text{ higher-order bits of } r1c)\} \| \\ &\quad \{\text{carry } 3(+)(1 \text{ least significant bit of } r1c)\}] \\ &= RU2[(a2 \| \text{carry } 3)(+)r1c] \\ &= U2[a2 \| \text{carry } 3](+)\{(1 \text{ least significant bit of } r1b) \| r2c\} \\ &= (1 \text{ most significant bit of } T2[a2 \| \text{carry } 3]) \| \\ &\quad S[(8 \text{ lower-order bits of } T2[a2 \| \text{carry } 3])](+) \\ &\quad \{(1 \text{ least significant bit of } r1b) \| r2c\} \end{aligned} \quad (19)$$

Here, the following equation (20) is derived from the equation (5c).

$$T2[a2\|carry3]=(a2+carry3+k2)\mod(2^9) \quad (20)$$

The following equation (21) is derived from the equation (20), the equation (19), and the equation (11e).

$$rc2 = S[(8 \text{ lower-order bits of } T2[a2\|carry\ 3])](+)r2c \quad (21)$$
$$= S[(a2+carry\ 3+k2)\mod(2^{\wedge}8)](+)r2c$$

Furthermore, the following equation (22) is derived from the equation (20), the equation (19), and the equation (11f).

$$rca2 = (1 \text{ most significant bit of } T2[a2\|carry\ 3])(+) \quad (22)$$
$$(1 \text{ least significant bit of } r1b)$$
$$= \{1 \text{ most significant bit of } ((a2+carry\ 3+k2)\mod(2^{\wedge}9))\}$$
$$(+)(1 \text{ least significant bit of } r1b)$$

Here, {1 most significant bit of ((a2+carry3+k2)mod (2^9))} is a carry (0 or 1) to a high-order byte in byte data addition (a2+carry3+k2), so that, if this carry is hereinafter represented as "carry 2", the equation (22) can be expressed as the following equation (23).

$$rca2=carry2(+)(1 \text{ least significant bit of } r1b) \quad (23)$$

From the above, the following equations (24) and (25) are obtained.

$$rc3=S[(a3+k3)\mod(2^{\wedge}8)](+)r2d \quad (24)$$

$$rc2=S[(a2+carry3+k2)\mod(2^{\wedge}8)](+)r2c \quad (25)$$

By repeating the equation transformation in the above-described manner, the following equations (26) and (27) are obtained.

$$rc1=S[(a1+carry2+k1)\mod(2^{\wedge}8)](+)r2b \quad (26)$$

$$rc0=S[(a0+carry1+k0)\mod(2^{\wedge}8)](+)r2a \quad (27)$$

Here, the carry 2 and the carry 1 represent carries (0 or 1) to a high-order byte in byte data additions (a2+k2) and (a1+k1), respectively.

From the equation (24), the equation (25), the equation (26), and the equation (27), the following is known. In other words, when $$RC=rc0\|rc1\|rc2\|rc3$$

and $$R2=r2a\|r2b\|r2c\|r2d,$$

relationship between (i) RC and k2 and (ii) the intermediate data C of FIG. 4 becomes $$RC=C(+)R2.$$

Further, by executing the equation transformation in the above-described manner, $$RE=E(+)R3$$

is known. Here, $$RE=re0\|re1\|re2\|re3$$

$$R3=r3a\|r3b\|r3c\|r3d$$

The converted program tP executes the RE(+)R3 operation on the randomized output data RE as shown at S206 of FIG. 15, and thereby derives output data E. That is, it is proved that the output data E obtained by the processing of the program tP is equivalent to the output data E obtained by the processing of the program P.

As discussed above, according to the present embodiment, the program converter can convert the program P including arithmetic additions into the converted program tP equivalent to the program P. Moreover, the converted program tP uses two conversion tables of 9-bit input and 8-bit output, four conversion tables of 9-bit input and output, and two conversion tables of 8-bit input and 9-bit output. A total of the table capacity is 3904 bytes. Thus, the converted program tP uses tables having an adequately compact size and can be implemented at a practical cost.

Furthermore, the conversion tables used in the converted program tP are randomized using random numbers. Therefore, it is possible to execute secure encryption against the unauthorized deciphering methods for analyzing intermediate data during execution of the encryption and specifying encryption key data.

<Variations>

Note that the present embodiment has described the structure in which the converted program tP which has been generated by the program converter 1 is previously stored in a ROM or the like in the encryption module, but the present invention is not limited to this structure. For example, as shown in FIG. 16, it is possible to have a structure in which a program conversion unit 41 which executes the same processing of the program converter 1 is included in an encryption device 4, and every time encryption is executed, the converted program tP is generated from the program P for executing the encryption.

Figure 16:
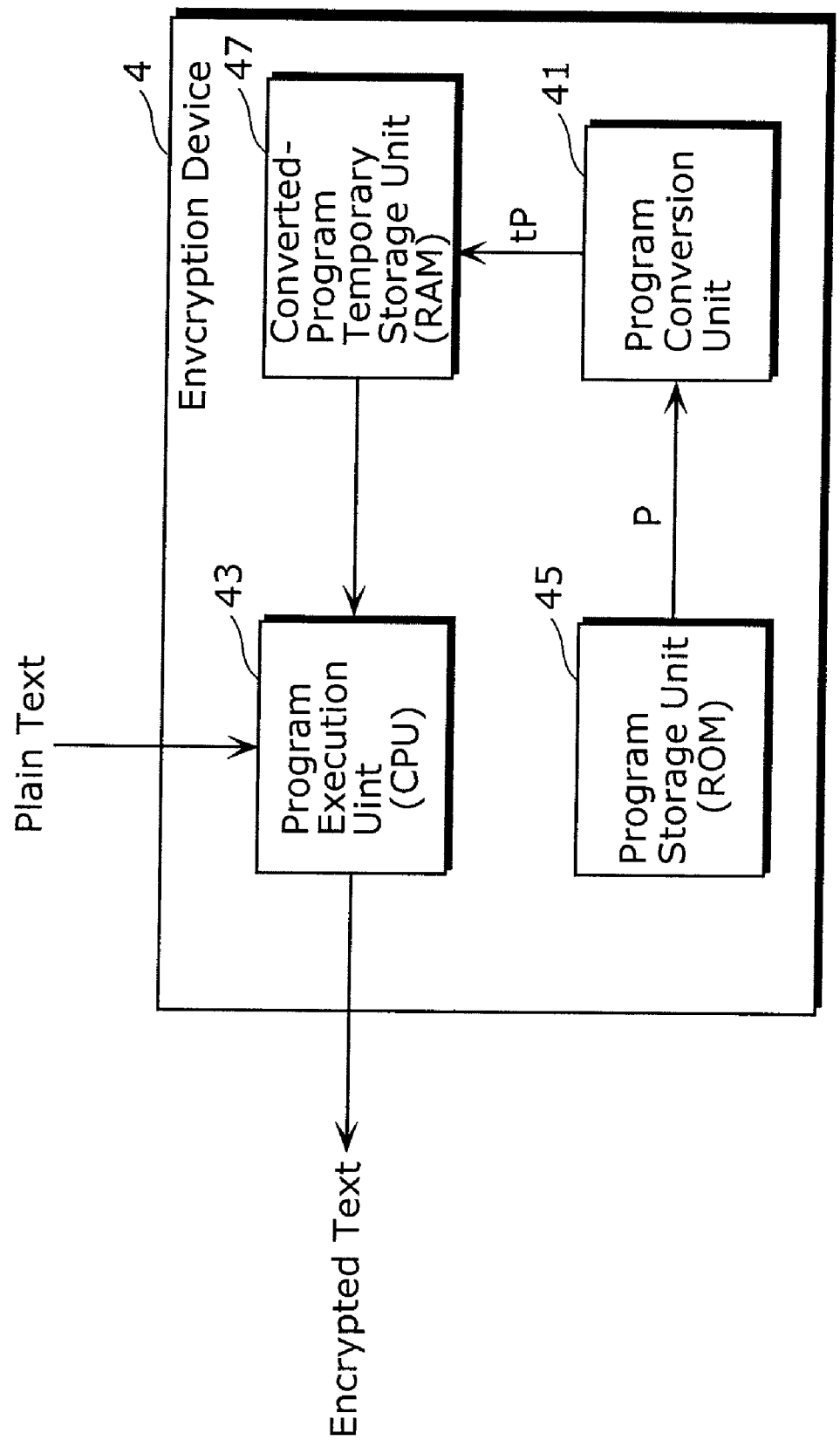
FIG. 16 is a block diagram showing a structure of the encrypting device, according to the embodiment of the present invention.

In FIG. 16, the encryption device 4 includes a program storage unit 45, a program conversion unit 41, a converted-program temporary storage unit 47, and a program execution unit 43.

The program storage unit 45 is a storage unit in which the program P for executing encryption is stored.

The program conversion unit 41 is a processing unit which converts the program P stored in the program storage unit 45 into the converted program tP.

The converted-program temporary storage unit 47 is a storage unit in which the converted program tP generated by the program conversion unit 41 is temporarily stored.

The program execution unit 43 is a processing unit which executes the converted program tP stored in the converted-program temporary storage unit 47.

Processing of encryption executed by the encryption device 4 is as follows. Firstly, the program storage unit 45 is assumed to have, for example, the program P which has been described in the above embodiment. The program conversion unit 41 reads the program P from the program storage unit 45, processes the program P in the same manner described in the above embodiment, thereby generates the converted program tP, and stores the tP into the converted-program temporary storage unit 47. Then, according to the converted program tP stored in the converted-program temporary storage unit 47, the program execution unit 43 encrypts an input plain text and outputs the result as an encrypted text. In the case of this structure, the generation of the converted program tP is executed for each encryption. This means that each converted program tP is generated using each different random number, so that intermediate data during the encryption is randomized using a different random number each time, which makes it difficult to analyze the encryption key data.

Further, the program to be converted is not limited to the example described in the present embodiment, but may be any encryption using arithmetic additions.

Furthermore, the program to be converted may be encryption using arithmetic subtractions. Even in such encryption, the arithmetic subtraction is described by a table and the generated table is randomized, which makes it difficult to analyze the encryption key data. More specifically, an arithmetic subtraction table whose indexes are: data to be subtracted; and data of a borrow from a higher-order digit, and whose elements are: a subtracted result on the digit (a result of an operation on the data to be subtracted, partial key data, and the borrow data from a higher-order digit); and a borrow data to a lower-order digit, is generated and the generated arithmetic subtraction table is randomized.

Note that the present invention has been described based on the above embodiment, but of course, the present invention is not limited to the above embodiment. The followings are also included in the present invention.

(1) Each of the above-described devices is, more specifically, a computer system having a micro-processor, a ROM, a RAM, a hard disk unit, a display unit, a key-board, a mouse, and the like. In the RAM or the hard disk unit, a computer program is stored. The micro-processor operates according to the computer program, so that each of the devices achieves its functions. Here, in order to achieve the predetermined functions, the computer program has a structure in which a plurality of instruction codes each of which represents an instruction for the computer are concatenated.

(2) A part or all of the elements included in each of the above-described devices may be integrated into a single system Large Scale Integration (LSI). The system LSI is a super multi-functional LSI produced by stacking a plurality of elements on a single chip, and an example of such a system LSI is a computer system having a micro-processor, a ROM, a RAM, and the like. In the RAM, a computer program is stored. The micro processing unit operates according to the computer program, so that the system LSI achieves its functions.

Note also that each element included in each of the above-described devices may be integrated separately into a single chip, or a part or all of the elements may be integrated into a single chip.

Note also that the integrated circuit is here referred to as the system LSI, but the integrated circuit can be called an IC, a LSI, a super LSI or an ultra LSI depending on their degrees of integration. Note also that the integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the elements as an integrated circuit. For example, biotechnology and the like can be applied to the above implementation.

(3) A part or all of the elements included in each of the above-described devices may be included in an IC card or a single module which is detachable from the device. Each of the IC card and the module is a computer system having a micro-processor, a ROM, a RAM, and the like. Each of the IC card and the module may has the above-described super multi-functional LSI. The micro-processor operates according to the computer program, so that the IC card and the module achieve their functions. The IC card and the module may have tamper resistance.

(4) The present invention may be the methods described as above. Note also that the present invention may be a computer program realizing these methods using a computer, or may be digital signals including the above-described computer program.

Note also that the present invention may be a computer-readable recording medium which can read the computer program or the digital signals, and examples of the recording medium are a flexible disk, a hard disk, a CD-ROM, a MO, a DVD, a DVD-ROM, a DVD-RAM, a Blu-ray Disc (BD), a semiconductor memory, and the like, in each of which the computer program or the digital signals are recorded.

Note also that the present invention may transfer the computer program or the digital signals via a telecommunication circuit, a radio or a cable broadcasting communication line, a network represented by the Internet, data broadcasting, or the like.

Note also that the present invention may be a computer system having a micro-processor and a memory. In the memory, the computer program is stored. The micro-processor operates according to the computer program.

Note also that it is possible to implement the present invention in another different computer system, by transferring the program or the digital signals recorded in the recording medium to another computer system, or by transferring the program or the digital signals via the network or the like to another computer system.

(5) The above-described embodiment and variations may be combined.

INDUSTRIAL APPLICABILITY

The program converter according to the present invention can reduce a table capacity of the mounted conversion tables more than the conventional technologies, and also can execute secure encryption against unauthorized deciphering methods for analyzing encryption key data by monitoring resistor data during the encryption or unauthorized deciphering methods for analyzing encryption key data from electric power consumption during the encryption, so that the present invention is suitable to realize an encryption module or the like which is required to be realized at a low cost.

The invention claimed is:

1. An encrypting device that executes encryption including (a) arithmetic addition on N-bit (N is an integer of 2 or more) addition-target data X and N-bit key data K and (b) conversion of a result of the arithmetic addition, said encrypting device comprising at least one microprocessor configured to operate as the following units:

a separation unit configured to separate the addition-target data X into n partial addition-target data $x_i$ (i=0 to n−1), each of which has $N_i$ bits sequentially obtained from a most significant bit in the addition-target data X;

a conversion table storage unit configured to store, for each i (i=0 to n−1), a conversion table $RTab_i$ that outputs converted data generated by converting a partial addition result that is a result of arithmetic addition on at least the partial key data $k_i$ and $N_i$-bit input data from among (a) partial key data $k_i$, (b) carried data $c_{i+1}$, and (c) the input data, (a) the partial key data $k_i$ being included in n partial key data $k_0$ to $k_{n-1}$ which are generated by separating the key data K by $N_i$ bits sequentially from a most significant bit in the key data K, and (b) the carried data $c_{i+1}$ being obtained from an arithmetic addition on (b1) partial key data $k_{i+1}$ included in the n partial key data $k_0$ to $k_{n-1}$ and (b2) the partial addition-target data included in the n partial addition-target data $x_i$ (i=0 to n−1);

an acquisition unit configured to acquire, for each i (i=0 to n−1), from the conversion table $RTab_i$, a converted partial added data $re_i$ that is the converted data generated by converting the partial addition result where the input data is the partial addition-target data $x_i$; and a concatenation unit configured to concatenate the converted partial added data $re_i$ generated for i=0 to n−1, so as to generate converted data generated by converting a result of arithmetic addition on the addition-target data X and the key data K, wherein, for each i (i=1 to n−1), the conversion table $RTab_i$ is a table that outputs carried data $c_i$ indicating a carry to a higher digit of the partial addition result, to a conversion table $RTab_{i-1}$, and the conversion table $RTab_i$ of each i (i=0 to n−2) is a table that outputs converted data generated by converting a partial addition result which is a result of arithmetic addition on the partial key data $k_i$, the input data, and the carried data $c_{i+1}$, when the carried data $c_{i+1}$ outputted from a conversion table $RTab_{i+1}$ indicates occurrence of a carry to a higher digit, and a table that outputs converted data generated by converting a partial addition result which is a result of arithmetic addition on the partial key data $k_i$ and the input data, when the carried data $c_{i+i}$ outputted from the conversion table $RTab_{i+1}$ indicates no occurrence of a carry to a higher digit.

2. The encrypting device according to claim 1, further comprising:

a storage unit configured to store a first predetermined value; and a conversion unit configured to generate, for each i (l=0 to n−1), converted partial addition-target data $rx_i$, by converting the partial addition-target data $x_i$ based on the first predetermined value, wherein the conversion table $RTab_i$ of each i (i=0 to n−1) is a table that outputs converted data generated by converting a partial addition result corresponding to the input data, when data generated by converting the input data based on the first predetermined value is provided as an index, and said acquisition unit is configured to acquire, as the converted partial added data $re_i$ data outputted from the conversion table $RTab_i$ when the converted partial addition-target data $rx_i$ is provided as an index.

3. The encrypting device according to claim 2, wherein said storage unit is further configured to store a second predetermined value, the conversion table $RTab_i$ of each i (i=0 to n−1) is a table that outputs converted data generated by converting the partial addition result corresponding to the input data based on the second predetermined value, when data generated by converting the input data based on the first predetermined value is provided as an index, and said encrypting device further comprises a reconstruction unit configured to reconstruct, by using the second predetermined value, the converted data concatenated by said concatenation unit, so as to de-convert the conversion executed based on the second predetermined value.

4. The encrypting device according to claim 3, wherein each of the first predetermined value and the second predetermined value stored in said storage unit is a random number generated when the conversion table $Rtab_i$ is generated.

5. The encrypting device according to claim 1, wherein the encryption includes, for each i (i=0 to n−1), predetermined conversion $S_i$ for each partial output data $Z_i$, the partial output data $Z_i$ being generated by separating (a) the result of the arithmetic addition on the addition-target data X and the key data K into (b) n partial data, each of which has $N_i$ bits sequentially obtained from a most significant bit in the result, the conversion table $RTab_i$ of each i (i=0 to n−1) is a table that outputs data generated by executing the predetermined conversion $S_i$ on the partial addition result, and said acquisition unit is configured to acquire, as the converted partial added data $re_i$, the data generated by executing the predetermined conversion $S_i$ on the partial addition result where the input data is the partial addition-target data $x_i$.

6. The encrypting device according to claim 1, wherein the encryption includes, for each i (i=0 to n−1), predetermined conversion $S_i$ for each partial output data $Z_i$, the partial output data $Z_i$ being generated by separating (a) the result of the arithmetic addition on the addition-target data X and the key data K into (b) n partial data, each of which has $N_i$ bits sequentially obtained from a most significant bit in the result, and said encrypting device further comprises:

a storage unit configured to store a first predetermined value and a second predetermined value;

a conversion unit configured to generate, for each i (i=0 to n−1), converted partial addition-target data $rx_i$, by converting the partial addition-target data $x_i$ based on the first predetermined value; and a reconstruction unit configured to reconstruct, by using the second predetermined value, the converted data concatenated by said concatenation unit, so as to obtain data generated by concatenating pieces of data which are generated by executing the predetermined conversion $S_i$ on each of the partial key output data $Z_i$, wherein the conversion table $RTab_i$ of each i (i=0 to n−1) is a table that outputs data generated by executing (a) the predetermined conversion $S_i$ and (b) the conversion executed based on the second predetermined value on the partial addition result where the input data is the partial addition-target data $x_i$, when the data generated by converting the input data based on the first predetermined value is provided as an index, and said acquisition unit is configured to acquire, as the converted partial added data $re_i$, the data outputted from the conversion table $Rtab_i$ when the converted partial addition-target data $rx_i$ is provided as an index.

7. The encrypting device according to claim 1, further comprising an execution unit configured to execute an encryption program, wherein said separation unit, said acquisition unit, and said concatenation unit are implemented, by executing the encryption program by said execution unit to serve as said separation unit, said acquisition unit, and said concatenation unit.

8. An encrypting method that is used in an encrypting device that executes encryption including (a) arithmetic addition on N-bit (N is an integer of 2 or more) addition-target data X and N-bit key data K and (b) conversion of a result of the arithmetic addition, the encrypting device including at least one microprocessor configured to operate as the following units: a separation unit; an acquisition unit; a concatenation unit; and a conversion table storage unit configured to store, for each i (i=0 to n−1), a conversion table $RTab_i$ that outputs converted data generated by converting a partial addition result that is a result of arithmetic addition on at least the partial key data $k_i$ and $N_i$-bit input data from among (a) partial key data $k_i$, (b) carried data $c_{i+1}$, and (c) the input data, (a) the partial key data $k_i$ being included in n partial key data $k_0$ to $k_{n-1}$ which are generated by separating the key data K by $N_i$ bits sequentially from a most significant bit in the key data K, and (b) the carried data $c_{i+1}$ being obtained from an arithmetic addition on (b1) partial key data $k_{i+1}$ included in the n partial key data $k_0$ to $k_{n-1}$ and (b2) the partial addition-target data $x_{i+1}$ included in the n partial addition-target data $x_i$ (i=0 to n−1), said encrypting method comprising:

separating, by the separation unit, the addition-target data X into n partial addition-target data $x_i$ (i=0 to n−1), each of which has $N_i$ bits sequentially obtained from a most significant bit in the addition-target data X;

acquiring, by the acquisition unit, for each i (i=0 to n−1), from the conversion table $RTab_i$ stored in the conversion table storage unit, converted partial added data $re_i$ that is the converted data generated by converting the partial addition result where the input data is the partial addition-target data $x_i$; and concatenating, by the concatenation unit, the converted partial added data $re_i$ generated for i=0 to n−1, so as to generate converted data generated by converting a result of arithmetic addition on the addition-target data X and the key data K, wherein, for each i (i=1 to n−1), the conversion table $RTab_i$ is a table that outputs carried data $c_i$ indicating a carry to a higher digit of the partial addition result, to a conversion table $RTab_{i-1}$, and the conversion table $RTab_i$ of each i (i=0 to n−2) is a table that outputs converted data generated by converting a partial addition result which is a result of arithmetic addition on the partial key data $k_i$, the input data, and the carried data $c_{i+1}$, when the carried data $c_{i+1}$ outputted from a conversion table $RTab_{i+1}$ indicates occurrence of a carry to a higher digit, and a table that outputs converted data generated by converting a partial addition result which is a result of arithmetic addition on the partial key data $k_i$ and the input data, when the carried data $c_{i+1}$ outputted from the conversion table $RTab_{i+1}$ indicates no occurrence of a carry to a higher digit.

9. A non-transitory recording medium having an encryption program causing a computer to execute encryption including (a) arithmetic addition on N-bit (N is an integer of 2 or more) addition-target data X and N-bit key data K and (b) conversion of a result of the arithmetic addition, wherein the computer has a memory storing, for each i (i=0 to n−1), a conversion table $RTab_i$ that outputs converted data generated by converting a partial addition result that is a result of arithmetic addition on at least the partial key data $k_i$ and $N_i$-bit input data from among (a) partial key data $k_i$, (b) carried data $c_{i+1}$, and (c) the input data, (a) the partial key data $k_i$ being included in n partial key data $k_0$ to $k_{n-1}$ which are generated by separating the key data K by $N_i$ bits sequentially from a most significant bit in the key data K, and (b) the carried data $c_{i+1}$ being obtained from an arithmetic addition on (b1) partial key data $k_{i+1}$ included in the n partial key data $k_0$ to $k_{n-1}$ and (b2) the partial addition-target data $x_{i+1}$ included in the n partial addition-target data $x_i$ (i=0 to n−1), said encryption program causing a processor to execute:

separating the addition-target data X into n partial addition-target data $x_i$ (i=0 to n−1), each of which has $N_i$ bits sequentially obtained from a most significant bit in the addition-target data X;

acquiring, for each i (i=0 to n−1), from the conversion table $RTab_i$ a converted partial added data $re_i$ that is the converted data generated by converting the partial addition result where the input data is the partial addition-target data $x_i$; and concatenating a plurality of the converted partial added data $re_i$ generated for i=0 to n−1, so as to generate converted data generated by converting a result of arithmetic addition on the addition-target data X and the key data K, wherein, for each i (i=1 to n−1), the conversion table $RTab_i$ is a table that outputs carried data $c_i$ indicating a carry to a higher digit of the partial addition result, to a conversion table $RTab_{i-1}$, and the conversion table $RTab_i$ of each i (i=0 to n−2) is a table that outputs converted data generated by converting a partial addition result which is a result of arithmetic addition on the partial key data $k_i$, the input data, and the carried data $c_{i+1}$, when the carried data $c_{i+1}$ outputted from a conversion table $RTab_{i+1}$ indicates occurrence of a carry to a higher digit, and a table that outputs converted data generated by converting a partial addition result which is a result of arithmetic addition on the partial key data $k_i$ and the input data, when the carried data $c_{i+1}$ outputted from the conversion table $RTab_{i+1}$ indicates no occurrence of a carry to a higher digit.

10. An integrated circuit that executes encryption including (a) arithmetic addition on N-bit (N is an integer of 2 or more) addition-target data X and N-bit key data K and (b) conversion of a result of the arithmetic addition, said integrated circuit comprising:

a separation unit configured to separate the addition-target data X into n partial addition-target data $x_i$ (i=0 to n−1), each of which has $N_i$ bits sequentially obtained from a most significant bit in the addition-target data X;

a conversion table storage unit configured to store, for each i (i=0 to n−1), a conversion table $Rtab_i$ that outputs converted data generated by converting a partial addition result that is a result of arithmetic addition on at least the partial key data $k_i$ and $N_i$-bit input data from among (a) partial key data $k_i$, (b) carried data $c_{i+1}$, and (c) the input data, (a) the partial key data $k_i$ being included in n partial key data $k_0$ to $k_{n-1}$ which are generated by separating the key data K by $N_i$ bits sequentially from a most significant bit in the key data K, and (b) the carried data $c_{i+1}$ being obtained from an arithmetic addition on (b1) partial key data $k_{i+1}$ included in the n partial key data $k_0$ to $k_{n-1}$ and (b2) the partial addition-target data $x_{i+1}$ included in the n partial addition-target data $x_i$ (i=0 to n−1);

an acquisition unit configured to acquire, for each i (i=0 to n−1), from the conversion table $Rtab_i$ a converted partial added data re, that is the converted data generated by converting the partial addition result where the input data is the partial addition-target data $x_i$; and a concatenation unit configured to concatenate the converted partial added data $re_i$ generated for i=0 to n−1, so as to generate converted data generated by converting a result of arithmetic addition on the addition-target data X and the key data K, wherein, for each i (i=1 to n−1), the conversion table $Rtab_i$ is a table that outputs carried data $c_i$ indicating a carry to a higher digit of the partial addition result, to a conversion table $RTab_{i-1}$, and the conversion table $Rtab_i$ of each i (i=0 to n−2) is a table that outputs converted data generated by converting a partial addition result which is a result of arithmetic addition on the partial key data $k_i$, the input data, and the carried data $c_{i+1}$, when the carried data $c_{i+1}$ outputted from a conversion table $RTab_{i+1}$ indicates occurrence of a carry to a higher digit, and a table that outputs converted data generated by converting a partial addition result which is a result of arithmetic addition on the partial key data $k_i$ and the input data, when the carried data $c_{i+1}$ outputted from the conversion table $RTab_{i+1}$ indicates no occurrence of a carry to a higher digit.

* * * * *